(12) United States Patent
Oh et al.

(10) Patent No.: US 11,872,095 B2
(45) Date of Patent: Jan. 16, 2024

(54) APPARATUS AND A METHOD TO VERIFY SAFE POSITIONING OF OSTEOTOMY TRAJECTORY FOR ZYGOMATIC IMPLANT SURGERY

(71) Applicant: American Dental Care of Langhorne PC, Ambler, PA (US)

(72) Inventors: Simon Oh, Ambler, PA (US); German Lee, Cherry Hill, PA (US)

(73) Assignee: American Dental Care of Langhorne PC, Ambler, PA (US)

(*) Notice: Subject to any disclaimer, the term of this patent is extended or adjusted under 35 U.S.C. 154(b) by 146 days.

(21) Appl. No.: 17/347,487

(22) Filed: Jun. 14, 2021

(65) Prior Publication Data
US 2022/0110714 A1  Apr. 14, 2022

Related U.S. Application Data

(60) Provisional application No. 63/089,526, filed on Oct. 8, 2020.

(51) Int. Cl.
*A61C 1/08* (2006.01)
*A61C 8/00* (2006.01)

(52) U.S. Cl.
CPC ............ *A61C 1/084* (2013.01); *A61C 8/0034* (2013.01); *A61C 8/0089* (2013.01)

(58) Field of Classification Search
CPC ........... A61C 1/084; A61C 1/082; A61C 1/08; A61C 1/00; A61C 1/02; A61C 8/0034; A61C 8/0089; A61C 8/0018; A61C 19/04; A61B 17/185; A61B 17/176; A61B 17/1739; A61B 17/17; A61B 17/16; A61B 2090/061

USPC .......................................................... 433/75
See application file for complete search history.

(56) References Cited

U.S. PATENT DOCUMENTS

| | | | |
|---|---|---|---|
| 5,688,283 A * | 11/1997 | Knapp | A61C 1/084 606/80 |
| 10,792,126 B2 | 10/2020 | Rosen et al. | |
| 2003/0009171 A1 * | 1/2003 | Tornier | A61B 17/1739 606/96 |

(Continued)

OTHER PUBLICATIONS

Zygo Guide, "Implant Placement Guide", https://zygoguide.com/product/zygo-guide/, Sep. 9, 2021, 1 page.

*Primary Examiner* — Ralph A Lewis
*Assistant Examiner* — Mirayda A Aponte
(74) *Attorney, Agent, or Firm* — LOZA & LOZA, LLP; Jun S. Ha

(57) ABSTRACT

An apparatus for verifying an osteotomy trajectory includes a straight rod portion extending along a first axis in a first direction, a sliding arm slidably coupled to the straight rod portion and configured to slide along a sliding direction on the straight rod portion along the first axis. The sliding arm may include a sliding portion slidably coupled to the straight rod portion to slide along the sliding direction, a pointing portion including a tip protruded along a second axis in a second direction, the second axis being at least substantially parallel to the first axis, and an extending portion having a first side attached to the sliding portion and a second side attached to the pointing portion. The apparatus further includes a fixed arm coupled to the straight rod portion and configured to mount a drill thereon to point the drill along the second axis toward the tip.

20 Claims, 18 Drawing Sheets

(56) References Cited

U.S. PATENT DOCUMENTS

2011/0112544 A1* 5/2011 Haber .................... A61C 1/084
606/96
2016/0157964 A1* 6/2016 Suttin .................... A61B 34/30
901/41
2019/0350674 A1 11/2019 Rosen et al.

* cited by examiner

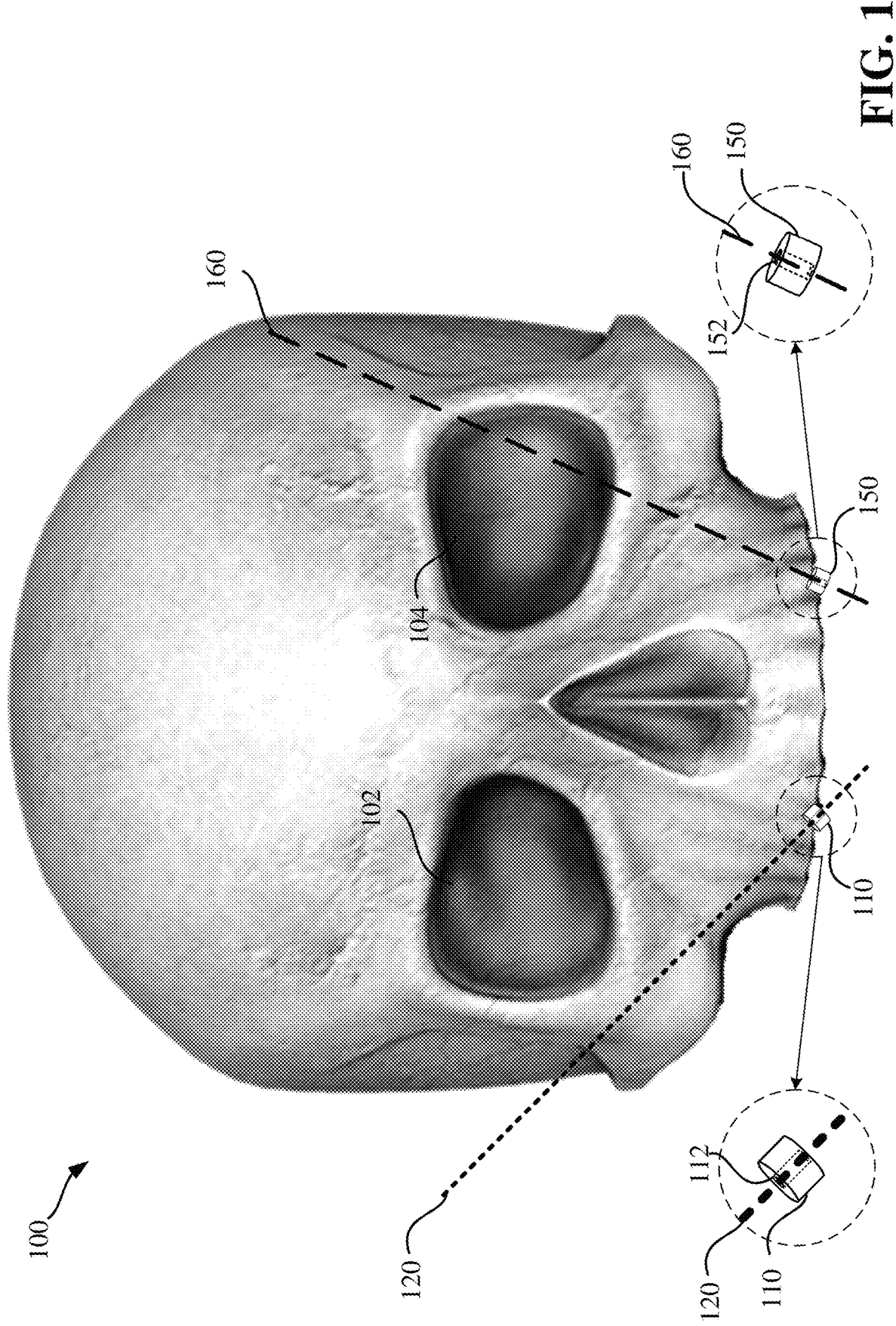

APPARATUS AND A METHOD TO VERIFY SAFE POSITIONING OF OSTEOTOMY TRAJECTORY FOR ZYGOMATIC IMPLANT SURGERY

PRIORITY CLAIM

This application claims priority to and the benefit of provisional patent application No. 63/089,526 filed in the United States Patent & Trademark Office on Oct. 8, 2020, the entire content of which is incorporated herein by reference as if fully set forth below in its entirety and for all applicable purposes.

TECHNICAL FIELD

The technology discussed below relates generally to an apparatus and a method for a dental implant surgery, and more particularly, to an apparatus and a method to verify safe positioning of osteotomy trajectory for zygomatic implant surgery.

INTRODUCTION

Dental implants have been widely installed in patients to provide fixated teeth to the patients. Zygomatic dental implants are generally installed in zygomatic bones of patients who have maxilla bones that are not suitable for conventional dental implants, e.g., due to severe atrophy in the maxilla. For a zygomatic dental implant, a drill is used to create a hole in a zygomatic bone of a patient, which is used to fixate the zygomatic dental implant. A trajectory of the drill for the zygomatic dental implanting may not always be accurately determined. Hence, the zygomatic dental implant approach may carry risks where the drill may enter and damage undesired areas in the patient.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus for verifying an osteotomy trajectory in a dental implant procedure is disclosed. The apparatus includes a straight rod portion extending along a first axis in a first direction, and a sliding arm slidably coupled to the straight rod portion and configured to slide along a sliding direction on the straight rod portion along the first axis without moving in a direction different from the sliding direction. The sliding arm includes a sliding portion slidably coupled to the straight rod portion to slide along the sliding direction, a pointing portion including a tip protruded along a second axis in a second direction, the second axis being at least substantially parallel to the first axis, and an extending portion having a first side attached to the sliding portion and a second side attached to the pointing portion. The apparatus further includes a fixed arm coupled to the straight rod portion and configured to mount a drill thereon to point the drill along the second axis toward the tip of the pointing portion.

In another example, an apparatus for verifying an osteotomy trajectory in a dental implant procedure is disclosed. The apparatus includes a straight rod portion extending along a first axis in a first direction, and a sliding arm slidably coupled to the straight rod portion and configured to slide along a sliding direction on the straight rod portion along the first axis without moving in a direction different from the sliding direction. The sliding arm includes a sliding portion slidably coupled to the straight rod portion to slide along the sliding direction, a pointing portion including a tip protruded along a second axis in a second direction, the second axis being at least substantially parallel to the first axis, and an extending portion having a first side attached to the sliding portion and a second side attached to the pointing portion. The apparatus further includes a fixed arm coupled to the straight rod portion and a drill protrusion attached to the fixed arm to extend along the second axis and to point the drill protrusion toward the tip of the pointing portion.

In another example, a method of verifying an osteotomy trajectory in a dental implant procedure using an osteotomy trajectory verification apparatus is disclosed. The method includes providing the osteotomy trajectory verification apparatus. The osteotomy trajectory verification apparatus includes a straight rod portion extending along a first axis in a first direction and a sliding arm slidably coupled to the straight rod portion and configured to slide along a sliding direction on the straight rod portion along the first axis without moving in a direction different from the sliding direction, and a fixed arm coupled to the straight rod portion. The sliding arm includes a sliding portion slidably coupled to the straight rod portion to slide along the sliding direction, a pointing portion including a tip protruded along a second axis in a second direction, the second axis being at least substantially parallel to the first axis, and an extending portion having a first side attached to the sliding portion and a second side attached to the pointing portion. In an aspect, the fixed arm is configured to mount a drill thereon to point the drill along the second axis toward the tip of the pointing portion and the drill is mounted at the fixed arm or a drill protrusion is attached to the fixed arm to point the drill protrusion toward the tip of the pointing portion while extending along the second axis. The method further includes positioning the sliding arm outside of an oral cavity of a patient, inserting the drill or the drill protrusion into an opening of a slot planted on a portion of the oral cavity of a patient, wherein the opening of the slot guides the drill or the drill protrusion in a direct of the osteotomy trajectory, sliding the sliding arm via the sliding portion along the sliding direction outside of the oral cavity to move the tip of the pointing portion along the second axis, and verifying the osteotomy trajectory based on the movement of the tip of the pointing portion along the second axis.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 1 is an example diagram illustrating osteotomy trajectories guided by slots, according to some aspects.

DETAILED DESCRIPTION

Figure 2A:
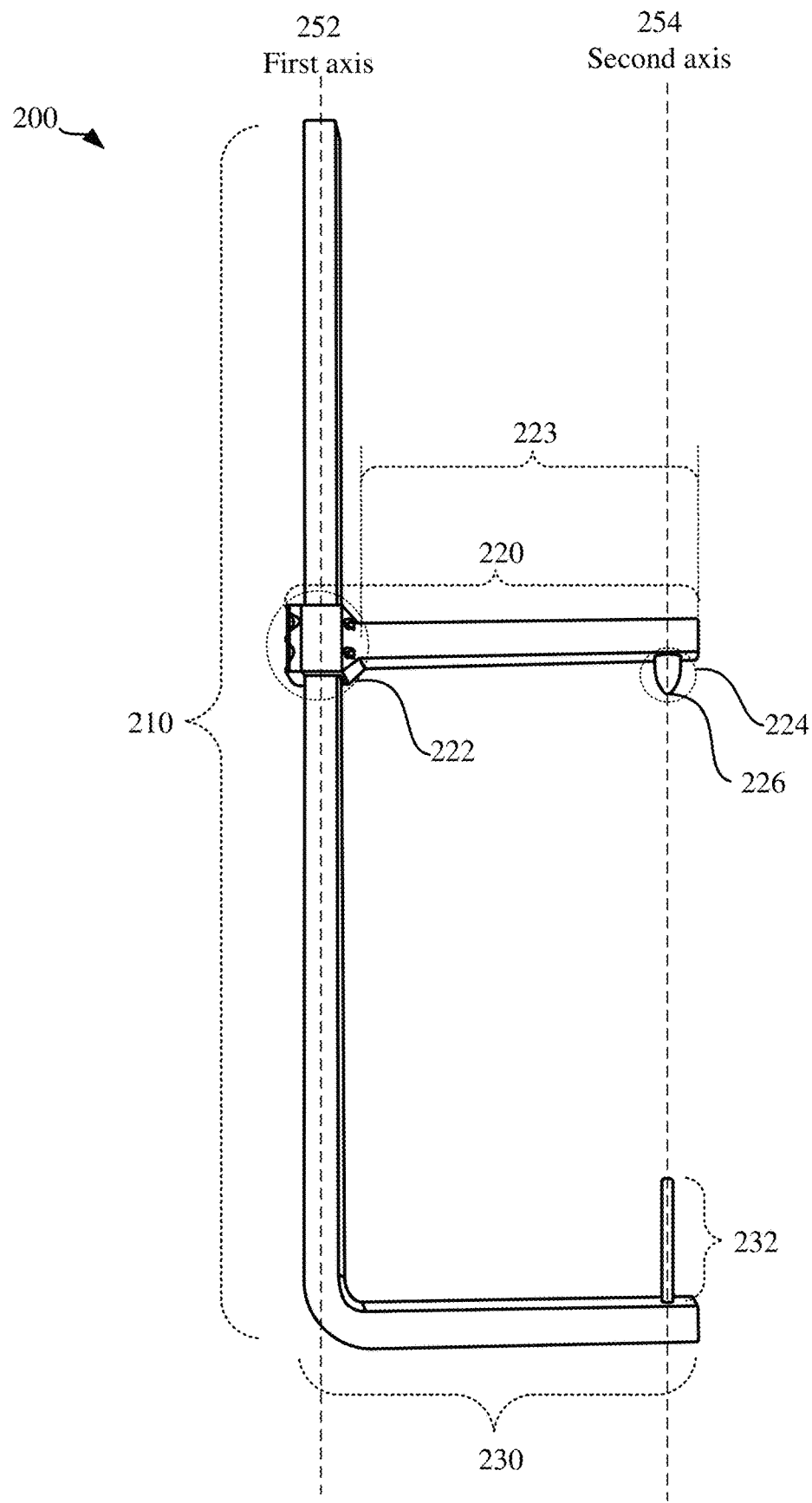
FIG. 2A is an example diagram illustrating a structure of an osteotomy trajectory verification apparatus, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. In some practical settings, devices incorporating described aspects and features may also necessarily include additional components and features for implementation and practice of claimed and described embodiments. It is intended that innovations described herein may be practiced in a wide variety of device(s) of varying sizes, shapes and constitution.

Zygomatic implants may be installed in patients who have severe atrophy in the maxilla, in order to provide fixated teeth to these patients. The surgery of zygomatic implant installation generally involves site preparation, determination of proper trajectory, osteotomy, and placement of an implant. Unlike conventional dental implants, providing zygomatic implants may involve bi-cortical stabilization to ensure high amounts of stability, e.g., thus requiring implants that can be as long as 60 mm. Small angle changes from the pre-determined trajectory may lead to large variations in the back end of the osteotomy due to the length of these implants (e.g., ranging from 30 mm to 60 mm). At least for these reasons, the most critical and dangerous step of this process may be the final osteotomy which enters in the inferior aspect of the zygoma, and exits at the superior aspect of the zygoma. Because of the location of these implants, the vital structures that must be avoided may include, for example, the patient's orbit as well as its contents and the infratemporal fossa and its contents. Possible complications resulting from erroneous osteotomy may include but are not limited to blindness, uncontrollable bleeding, nerve injury, and death.

A problem with a current zygomatic implant surgical procedure, is that often times it is a blind procedure. Because the zygomatic implant surgical procedure generally involves an osteotomy with bi-cortical stabilization, it may be difficult to visualize and/or determine where a tip of a drill for the osteotomy will travel in the patient. In an example zygomatic implant surgical procedure, at first, a osteotomy trajectory for the zygomatic implanting may be planned, where a drill may be guided along the osteotomy trajectory. Subsequently, a trajectory slot (or a slot or a guide) with a planned osteotomy trajectory may be planted on a portion of the patient's oral cavity prior to a final osteotomy. For example, the slot may have a hole to insert the drill in a direction of the osteotomy trajectory. Hence, the slot may guide the drill to the osteotomy trajectory via the slot's opening as the drill enters a zygomatic bone of the patient after going through the hole of the slot. As the drill enters the zygomatic bone, the drill should avoid vital structures such as the infratemporal fossa and the orbit, e.g., to avoid damages to nerves and/or eyes. However, the actual osteotomy trajectory of the drill being inserted into the slot may not always correspond to the planned osteotomy trajectory. Further, the actual osteotomy trajectory of the drill during the actual osteotomy may be difficult to visualize at least due to the osteotomy process obstructing the surgeon's view, and thus it is difficult for the surgeon to verify that the actual osteotomy trajectory matches the planned osteotomy trajectory. In cases where the actual osteotomy trajectory deviates from the planned osteotomy trajectory, such variances in the osteotomy trajectory of the drill may cause a risk of the drill entering undesirable areas such as the infratemporal fossa and/or the orbit. Therefore, an effective approach to verify the osteotomy trajectory of the drill in the zygomatic implanting is desired.

FIG. 1 is an example diagram illustrating osteotomy trajectories guided by slots, according to some aspects. FIG. 1 shows a partial view of a skull 100 of a patient, which also show orbits 102 and 104. As illustrated in FIG. 1, a first slot 110 is planted on a portion of the patient's oral cavity. For example, the first slot 110 may be planted in an area where a dental implant will be installed. The first slot 110 has an opening 112 through the first slot 110, where the opening 112 of the first slot 110 may guide a drill toward a first osteotomy trajectory 120. In the example shown in FIG. 1, the first slot 110 is correctly planted, such that the first osteotomy trajectory 120 guided by the opening 112 of the first slot 110 avoids the orbits 102 and 104.

Further, as illustrated in FIG. 1, a second slot 150 is planted on another portion of the patient's oral cavity. For example, the second slot 150 may be planted in an area where another dental implant will be installed. The second slot 150 has an opening 152 through the second slot 150, where the opening 152 of the second slot 150 may guide a drill toward a second osteotomy trajectory 160. In this example, the second slot 150 is not correctly planted, and thus the second osteotomy trajectory guided by the opening 152 of the second slot 150 is directed toward the orbit 104. Hence, as illustrated in FIG. 1, verifying a osteotomy trajectory prior to drilling on the patient is advantageous, in order to ensure that the drill does not damage or touch particular structures of the patient, such as the infratemporal fossa and the orbit. For example, if the second osteotomy trajectory 160 guided by the second slot 150 is verified prior to drilling using the second slot 150, then damaging the orbit 104 by drilling in the second osteotomy trajectory 160 may be avoided.

According to some aspects of the disclosure, an osteotomy trajectory verification apparatus to verify an osteotomy trajectory (e.g., for a drill) is provided. This apparatus may be used after an osteotomy trajectory is planned and prior to an osteotomy procedure (e.g., using a drill) during a zygomatic implant surgery, to provide a visualization of an actual osteotomy trajectory and/or an exit of the osteotomy from outside of a mouth of the patient. For example, this apparatus may allow the surgeon to visualize where the drill will travel and where the drill will exit the zygoma relative to the orbit and infratemporal fossa, and thus may allow surgeon to understand the margin of safety during the osteotomy.

In an aspect, the osteotomy trajectory verification apparatus may include a straight rod portion extending along a first axis in a first direction, and a sliding arm slidably coupled to the straight rod portion and configured to slide along a sliding direction on the straight rod portion along the first axis without moving in a direction different from the sliding direction. The sliding arm may include a sliding portion slidably coupled to the straight rod portion to slide along the sliding direction, a pointing portion including a tip protruded along a second axis in a second direction, the second axis being at least substantially parallel to the first axis, and an extending portion having a first side attached to the sliding portion and a second side attached to the pointing portion. The osteotomy trajectory verification apparatus may further include a fixed arm fixedly coupled to the straight rod portion and configured to mount a drill thereon to point the drill along the second axis toward the tip of the pointing portion. The drill may be firmly mounted at the fixed arm such that the drill may align with the second axis and point toward the tip of the pointing portion of the sliding arm. Because the drill mounted at the fixed arm aligns with the second axis and the tip of the pointing portion of the sliding arm is protruded along the second axis, the tip of the pointing portion may travel along the second axis as the sliding arm slides along the sliding direction along the first axis that is parallel to the second axis. As such, the drill trajectory on the second axis may be visualized according to the travel path of the tip of the pointing portion on the second axis.

For example, after a slot is planted on a portion of the patient's oral cavity, the drill mounted at the fixed arm of the osteotomy trajectory verification apparatus may be inserted into an opening of the slot, while positioning the sliding arm outside of an oral cavity of a patient. When the drill is inserted into the opening of the slot, the drill may tightly fit into the opening of the slot, e.g., such that the drill may move when the drill is being pulled out. By sliding the sliding arm via the sliding portion outside of the oral cavity, the tip of the pointing portion of the sliding arm may travel along the second axis with which the drill is aligned, such that a drill trajectory of the drill may be visualized based on the travel path of the pointing portion. In one aspect, the pointing portion may be moved towards a face of the patient by sliding the sliding arm toward the face until the pointing portion is in contact with the face of the patient. At this point, an operator sliding the sliding arm may mark (e.g., using a pen) a contact point where the pointing portion contacts the patient's face, to visualize the drill trajectory. As such, the drill trajectory may be verified and visualized to ensure that the drill trajectory avoids vital structures such as the patient's orbit and its content and/or infratemporal fossa and its content.

FIG. 2A is an example diagram illustrating a structure of an osteotomy trajectory verification apparatus, according to some aspects. In FIG. 2A, the osteotomy trajectory verification apparatus 200 may include a straight rod portion 210, a sliding arm 220, and a fixed arm 230. The straight rod portion 210 may extend along a first axis 252 in a first direction. The fixed arm 230 may be fixedly (e.g., integrally) coupled to the straight rod portion 210.

The sliding arm 220 may be slidably coupled to the straight rod portion 210, and may be configured to slide along a sliding direction on the straight rod portion 210 along the first axis 252, without moving in a direction different from the sliding direction. For example, an operator of the osteotomy trajectory verification apparatus may slide the sliding arm 220 up and down along the slide direction.

The sliding arm 220 may include a sliding portion 222, a pointing portion 224, and an extending portion 223 having a first side attached to the sliding portion 222 and a second side attached to the pointing portion 224. For example, the first side of the extending portion 223 may be at an opposite end from the second side of the extending portion 223. In the example view shown FIG. 2A, the left side of the extending portion 223 is attached to the sliding portion 222 and the right side of the extending portion 223 is attached to the pointing portion 224. The sliding portion 222 of the sliding arm 220 may be slidably coupled to the straight rod portion 210 to slide along the sliding direction. For example, because the pointing portion 224 is attached to the sliding portion 222 via the extending portion 223, the pointing portion 224 moves together with the sliding portion 222 when the sliding portion 222 slides up and down along the sliding direction on the straight rod portion 210 along the first axis 252.

The sliding portion 222 of the sliding arm 220 may be slidably coupled to the straight rod portion 210 using one of various approaches known to a person of ordinary skill in the art. In one example, the sliding portion 222 may include an opening through which the straight rod portion 210 is slidably inserted to slidably couple to the sliding arm 220, such that the sliding portion 222 of the sliding arm 220 may slide along the straight rod portion 210 via the opening of the sliding portion 222 to slide along the first axis 252. In another example, the straight rod portion 210 may include a rail thereon and the sliding portion 222 may include an engaging portion to slidably engage with the rail, such that the sliding portion 222 and the sliding arm 220 may slide along the rail on the straight rod portion 210 to slide along the first axis 252.

The pointing portion 224 of the sliding arm 220 may include a tip 226 protruded along a second axis 254 in a second direction, where the second axis 254 is parallel to or substantially parallel to the first axis 252. The second direction may align with the second axis 254, and thus may be parallel to the first direction that may align with the first axis 252. For example, when an operator of the osteotomy trajectory verification apparatus slides the sliding arm 220 up and down, the pointing portion 224 moves up and down along the second axis 254. For example, as shown in FIG. 2A, the tip 226 is protruded along the second axis 254 toward the fixed arm.

The fixed arm 230 may be configured to mount a drill thereon to point the drill along the second axis 254 toward the tip 226 of the pointing portion 224. For example, as shown in FIG. 2A, the fixed arm 230 may include a drill mount 232 that is used to mount a drill, such that the drill mounted at the drill mount 232 is pointing toward the tip 226, and lines up along the second axis 254. The drill mount 232 in FIG. 2A is a protrusion protruding out along the second axis 254 to allow the protrusion to be inserted into a recess in a drill to fixedly mount the drill with the drill mount 232. In an example, the protrusion of the drill mount 232 may be aligned with the second axis 254 and may point toward the tip 226 of the pointing portion 224, to allow a drill to be aligned with the second axis 254 and to point toward the tip 226 of the pointing portion 224 when the drill is mounted into the protrusion of the drill mount 232.

The drill mount of the fixed arm 230 is not limited to a shape of the protrusion shown in FIG. 2A. In another example not shown in FIG. 2A, a drill mount of a fixed arm may be an recess slot to insert the drill and fixedly mount the drill, such that the drill is pointing toward the tip 226, and lines up along the second axis 254. For example, the recess may be aligned with the second axis 254, such that when the drill is inserted into the recess to be fixedly mounted, the drill may be aligned with the second axis 254 and may point toward the tip 226 of the pointing portion 224. In another example not shown in FIG. 2A, a drill mount of a fixed arm may be a universal female dental latch adapter that can be used to mount a drill, such that the drill may be aligned with the second axis 254 and may point toward the tip 226 of the pointing portion 224. In an aspect, the drill mount 232 may be removable and/or may be changed to a protrusion of a different size, to accommodate drills with different structures.

Figure 2B:
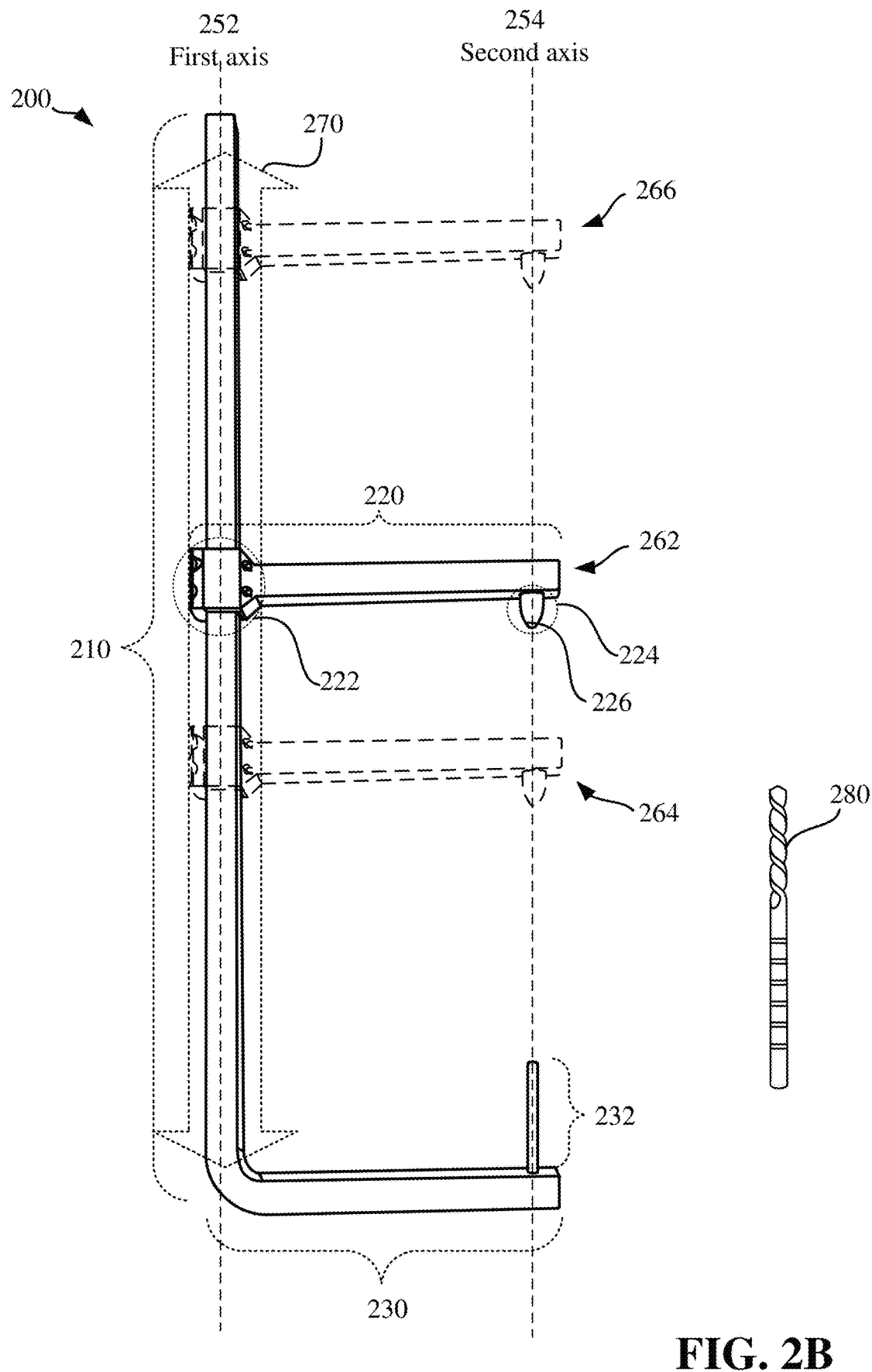
FIG. 2B is an example diagram illustrating a sliding arm being slidably coupled to a straight rod portion of the osteotomy trajectory verification apparatus, according to some aspects.

FIG. 2B is an example diagram illustrating the sliding arm 220 being slidably coupled to the straight rod portion 210 of the osteotomy trajectory verification apparatus 200, according to some aspects. As shown in FIG. 2B, the sliding portion 222 of the sliding arm 220 may slide along the first axis 252 while being slidably coupled to the straight rod portion 210, in the sliding direction 270, without moving in a direction different from the sliding direction 270. For example, by sliding the sliding portion 222, the sliding arm 220 at a first position 266 may slide to a second position 262 and may slide to a third position 264. FIG. 2B also shows a drill 280 that can be mounted at the drill mount 232. As shown in FIG. 2B, as the sliding portion 222 of the sliding arm 220 slides along the first axis 252, the tip 226 of the pointing portion 224 slides along the second axis 254.

Figure 2C:
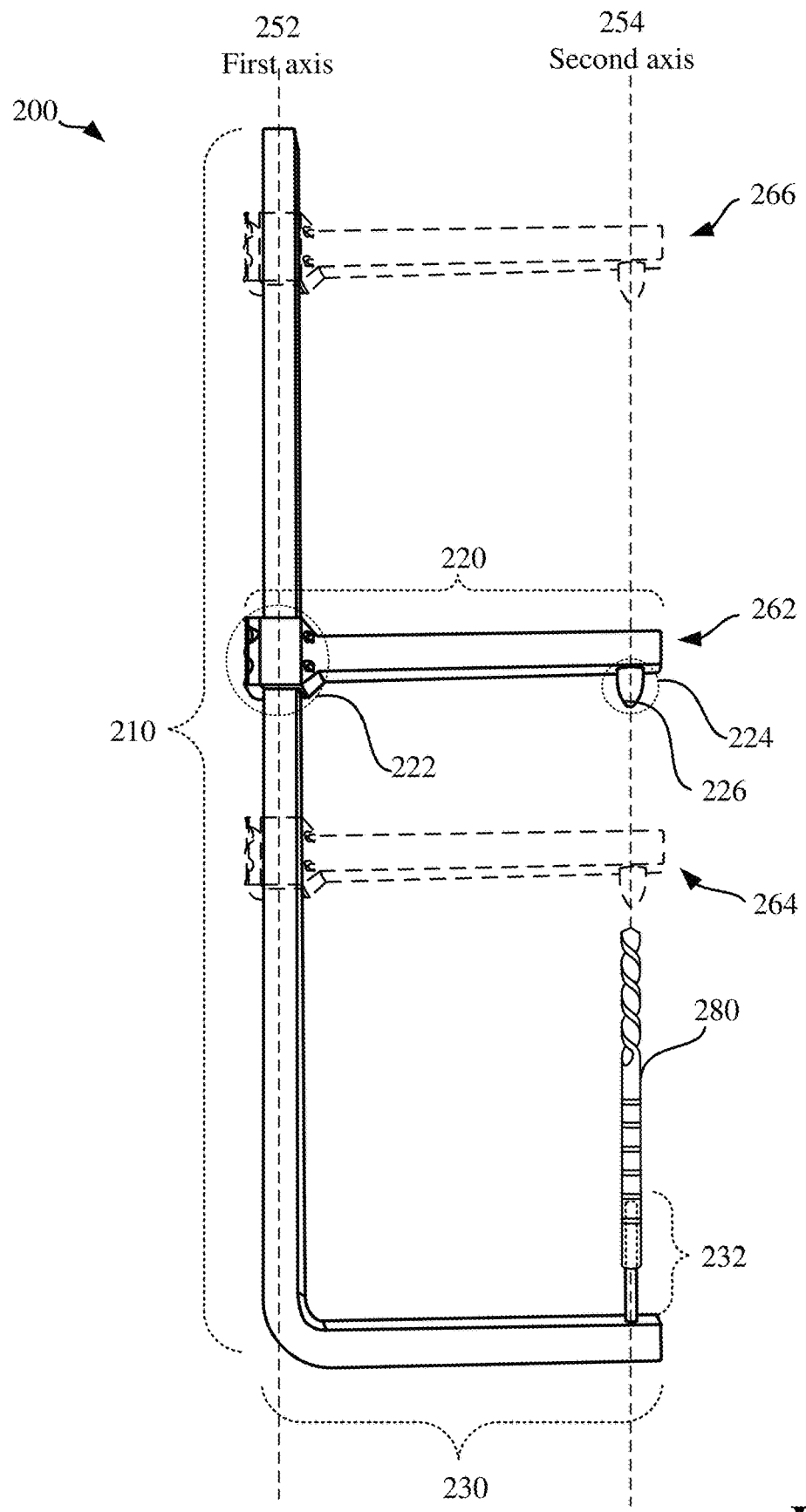
FIG. 2C is an example diagram illustrating the sliding arm being slidably coupled to the straight rod portion of the osteotomy trajectory verification apparatus, with a drill mounted at a drill mount of the osteotomy trajectory verification apparatus, according to some aspects.

FIG. 2C is an example diagram illustrating the sliding arm 220 being slidably coupled to the straight rod portion 210 of the osteotomy trajectory verification apparatus 200, with the drill 280 mounted at the drill mount 232 of the osteotomy trajectory verification apparatus 200, according to some aspects. As shown in FIG. 2C, the drill 280 may be mounted at the drill mount 232 such that the drill 280 points toward the tip 226 of the pointing portion 224 along the second axis 254. Hence, the drill 280 is aligned with the second axis 254. In FIG. 2C, by sliding the sliding portion 222, the sliding arm 220 at a first position 266 may slide to a second position 262 and may slide to a third position 264, while the tip 226 of the pointing portion 224 slides along the second axis 254.

As shown in FIGS. 2B and 2C, regardless of the position of the sliding arm 220, the pointing portion 224 and the tip 226 of the pointing portion 224 are aligned with the second axis 254 parallel to the first axis 252. Further, as shown in FIGS. 2B and 2C, regardless of the position of the sliding arm 220, the pointing portion 224 and the tip 226 of the pointing portion 224 point toward the drill mount 232.

As such, the second axis 254 that may align with a drill trajectory (or an osteotomy trajectory) may be indicated by the tip 226 of the pointing portion 224. For example, a location of the tip 226 of the pointing portion 224 may indicate a portion of the drill trajectory of the drill 280. For example, the tip 226 of the pointing portion 224 may slide with the sliding movement of the sliding arm 220 to indicate the drill trajectory of the drill 280, where the drill trajectory may align with the second axis 254. By observing the sliding movement of the tip 226 of the pointing portion 224, the drill trajectory of the drill 280 may be visualized.

Figure 2D:
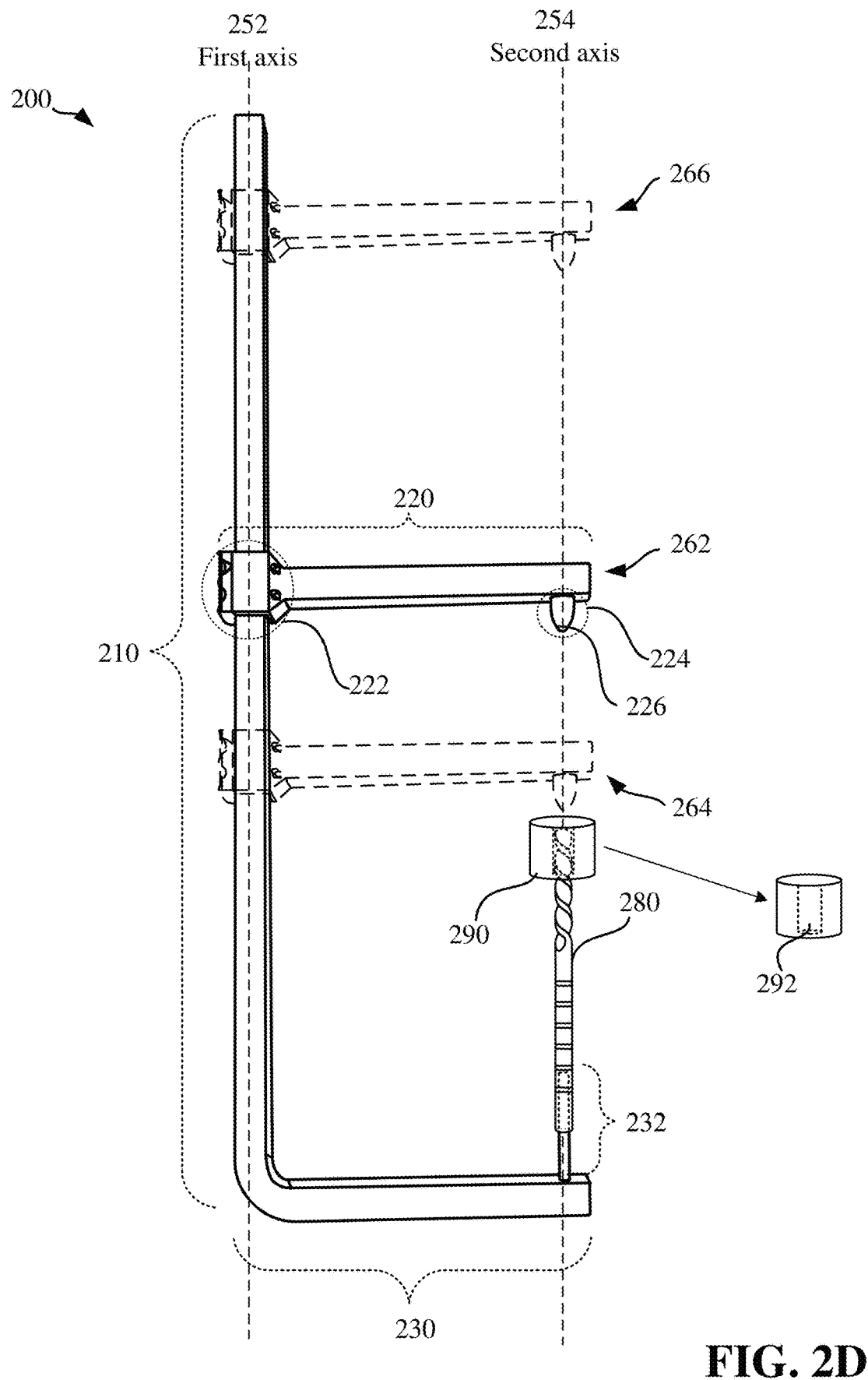
FIG. 2D is an example diagram illustrating the sliding arm being slidably coupled to the straight rod portion of the osteotomy trajectory verification apparatus, with the drill mounted at the drill mount of the osteotomy trajectory verification apparatus and inserted into a slot, according to some aspects.

FIG. 2D is an example diagram illustrating the sliding arm 220 being slidably coupled to the straight rod portion 210 of the osteotomy trajectory verification apparatus 200, with the drill 280 mounted at the drill mount 232 of the osteotomy trajectory verification apparatus 200 and inserted into a slot, according to some aspects. In FIG. 2D, by sliding the sliding portion 222, the sliding arm 220 at a first position 266 may slide to a second position 262 and may slide to a third position 264, while the tip 226 of the pointing portion 224 slides along the second axis 254. As discussed above, a slot such as a slot 290 may be planted on a portion of patient's oral cavity. The slot 290 has an opening 292 to receive a drill such as the drill 280 and guide the drill 280 along a drill trajectory/osteotomy trajectory defined by the opening 292. The osteotomy trajectory verification apparatus 200 may be moved to insert the drill 323 mounted at the drill mount 232 into the slot 290 via the opening 292 of the slot 290. For simplicity, the patient's oral cavity has not been illustrated in FIG. 2D.

When the drill 280 is inserted into the slot 290, the drill 280 fits tightly or snugly into the opening 292 of the slot 290 such that the drill may move only along the drill trajectory defined by the opening 292. Further, when the drill 280 is inserted into the slot 290, the drill trajectory defined by the opening 292 may overlap with the second axis 254. Hence, when the tip 226 of the pointing portion 224 is moved along the second axis 254, the tip 226 may move along the drill trajectory of the drill 280, thereby indicating where the drill 280 may travel as the drill 280 is inserted into the patient. The sliding arm 220 may stay outside the oral cavity of the patient when the drill 280 mounted at the drill mount 232 is inserted into the slot 290, and the tip 226 of the pointing portion 224 of the sliding arm 220 may be used to indicate the drill trajectory of the drill 280 and a location at which the drill 280 may exit out of the patient's skull. As such, while the drill 280 mounted at the drill mount 232 is inserted into the slot 290, the tip 226 of the pointing portion 224 may be used to visualize the drill trajectory and to verify that the drill trajectory does not align with undesirable areas of the patients. For example, if a position of the tip 226 indicates that the drill trajectory may be in or near a vital area such as an eye or an orbit or an infratemporal fossa of the patient, then this may indicate that the slot 290 is not correctly planted at the patient's oral cavity, and thus the slot 290 may be re-planted at the patient's oral cavity to avoid the drill trajectory being close to the vital area of the patient.

Figure 3A:
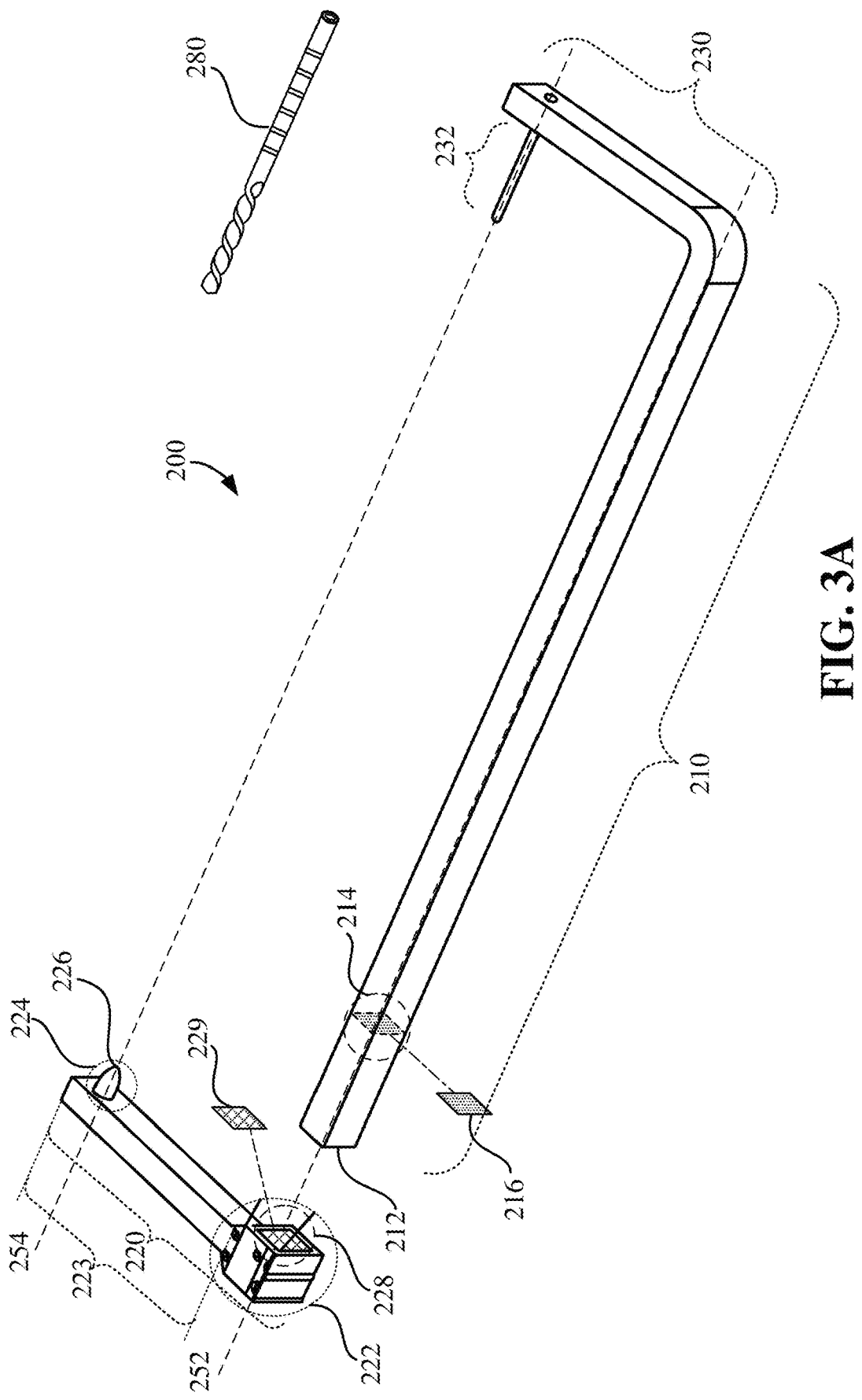
FIG. 3A is an example diagram illustrating a perspective, exploded view of the osteotomy trajectory verification apparatus of FIG. 2A, according to some aspects.

FIG. 3A is an example diagram illustrating a perspective, exploded view of the osteotomy trajectory verification apparatus 200 of FIG. 2A, according to some aspects. The descriptions on the structures associated with the reference numbers 210, 220, 222, 224, 226, 230, 232, 252, 254, and 280 are provided above in reference to FIGS. 2A-2D, and thus are omitted below for brevity. As shown in FIG. 3A, the sliding portion 222 of the sliding arm 220 may have an opening 228 having a shape 229, such that the straight rod portion 210 may be inserted into the opening 228, e.g., via an end 212 of the straight rod portion 210. A cross-section 214 of the straight rod portion 210 has a shape 216 that is substantially the same as the shape 229 of the opening 228. The cross-section 214 of the straight rod portion 210 may be slightly smaller than the opening 228 of the sliding arm 220 to allow the straight rod portion 210 to be inserted through the opening 228 of the sliding arm 220. Because the shape 216 of the cross-section 214 of the straight rod portion 210 is substantially the same as the shape 229 of the opening 228 of the sliding portion 222, the movement of the sliding portion 222 is limited to sliding along a first axis 252 on the straight rod portion 210 when the straight rod portion 210 is inserted through the opening 228 of the sliding arm 220. For example, because the shape 216 of the cross-section 214 of the straight rod portion 210 is substantially the same as the shape 229 of the opening 228 of the sliding portion 222, a rotation of the sliding portion 222 about the straight rod portion 210 (e.g., about the first axis 252) may be prevented. As such, when the sliding arm 220 slides up and down the straight rod portion 210 via the sliding portion 222, the pointing portion 224 and the tip 226 of the pointing portion 224 may stay on the second axis 254 while moving with the sliding arm 220.

The shape 216 of the cross-section 214 of the straight rod portion 210 and the shape 229 of the opening 228 of the sliding portion 222 in FIG. 2A are a rectangular shape. However, the shape 216 of the cross-section 214 of the straight rod portion 210 and the shape 229 of the opening 228 of the sliding portion 222 are not limited to a rectangular shape, but may be any shape that can limit the movement of the sliding portion 222 to sliding along a first axis 252 on the straight rod portion 210, such as a polygon shape (e.g., a triangle shape or a pentagon shape), an elliptical shape, and a star shape.

Figure 3B:
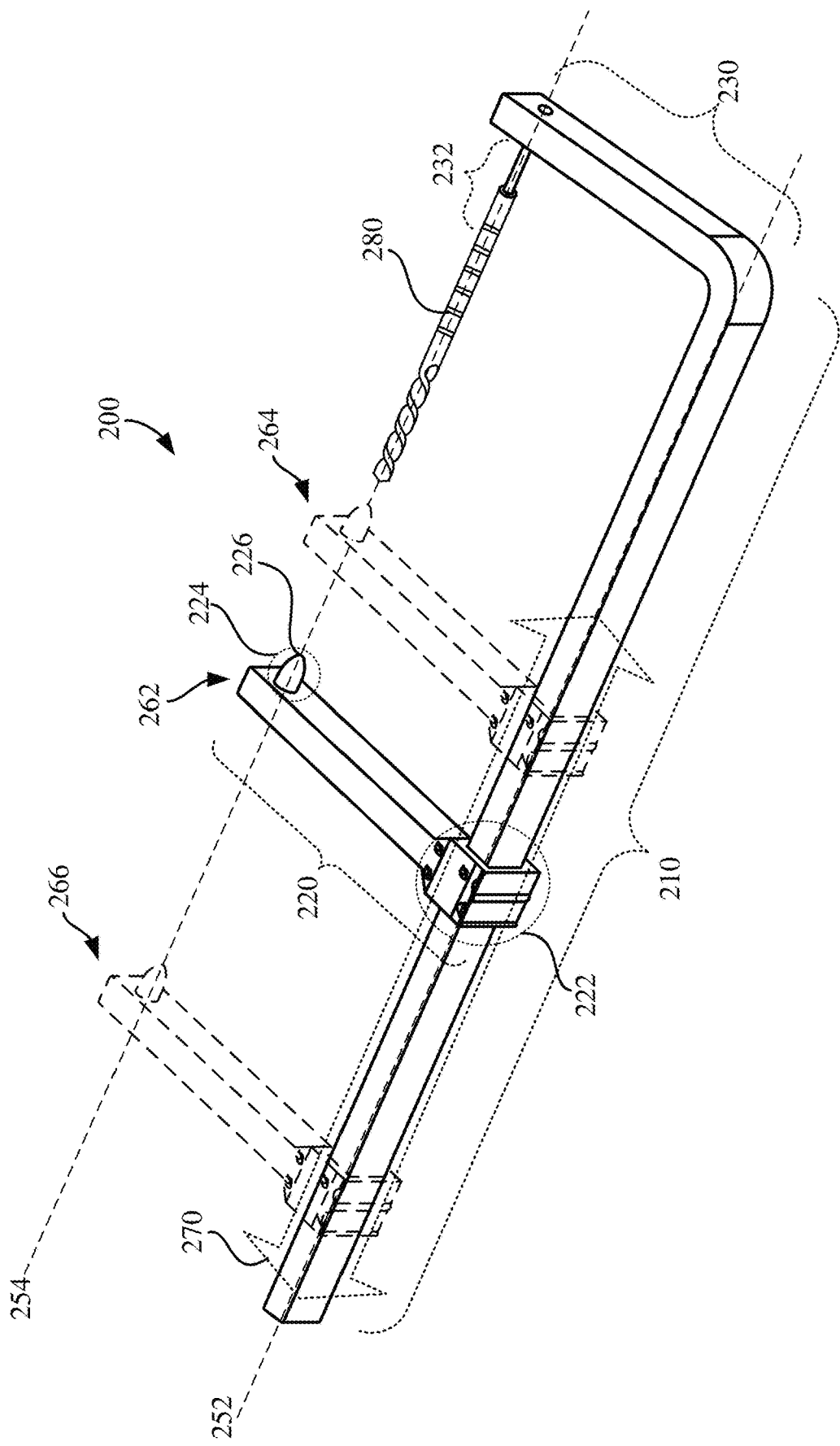
FIG. 3B is an example diagram illustrating a perspective view of the osteotomy trajectory verification apparatus of FIG. 2C, with the drill mounted at the drill mount of the osteotomy trajectory verification apparatus, according to some aspects.

FIG. 3B is an example diagram illustrating a perspective view of the osteotomy trajectory verification apparatus 200 of FIG. 2C, with the drill 280 mounted at the drill mount 232 of the osteotomy trajectory verification apparatus 200, according to some aspects. As shown in FIG. 3B, the drill 280 may be mounted at the drill mount 232 such that the drill 280 points toward the tip 226 of the pointing portion 224 along the second axis 254. Hence, the drill 280 is aligned with the second axis 254. As shown in FIG. 3B and as discussed above in reference to FIG. 2B, the sliding portion 222 of the sliding arm 220 may slide along the first axis 252 while being slidably coupled to the straight rod portion 210, in the sliding direction 270, without moving in a direction different from the sliding direction 270. For example, by sliding the sliding portion 222, the sliding arm 220 at a first position 260 may slide to a second position 262 and may slide to a third position 264, while the tip 226 of the pointing portion 224 slides along the second axis 254.

As shown in FIG. 3B as well as FIG. 2C, regardless of the position of the sliding arm 220, the pointing portion 224 and the tip 226 of the pointing portion 224 are aligned with the second axis 254 parallel to the first axis 252. Further, as shown in FIG. 3B as well as FIG. 2C, regardless of the position of the sliding arm 220, the pointing portion 224 and the tip 226 of the pointing portion 224 point toward the drill mount 232.

As such, the second axis 254 that may align with a drill trajectory (or an osteotomy trajectory) may be indicated by the tip 226 of the pointing portion 224. For example, a location of the tip 226 of the pointing portion 224 may indicate a portion of the drill trajectory of the drill 280. For example, the tip 226 of the pointing portion 224 may slide with the sliding movement of the sliding arm 220 to indicate the drill trajectory of the drill 280, where the drill trajectory may align with the second axis 254. By observing the sliding movement of the tip 226 of the pointing portion 224, the drill trajectory of the drill 280 may be visualized.

Figure 3C:
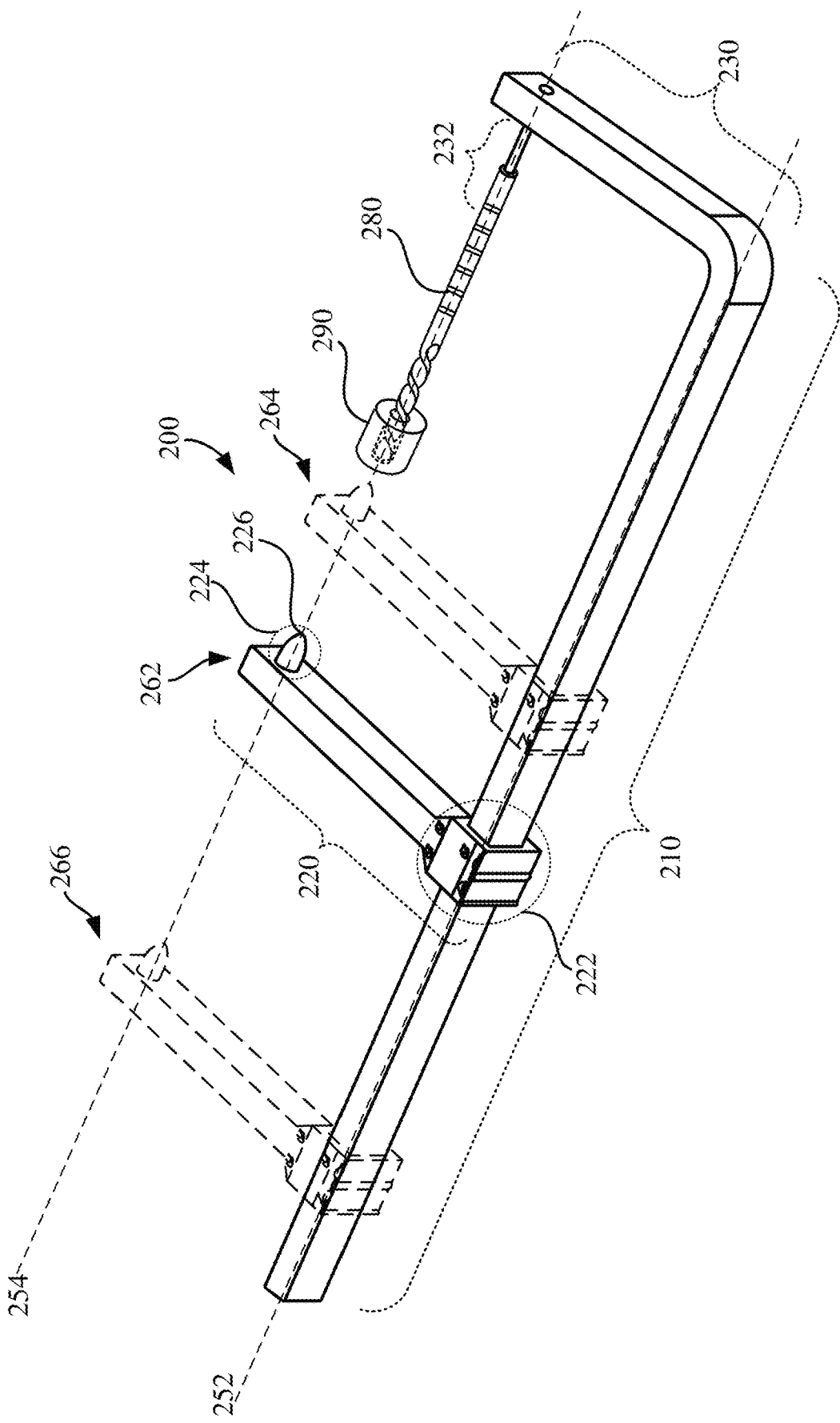
FIG. 3C is an example diagram illustrating a perspective view of the osteotomy trajectory verification apparatus of FIG. 2D, with the drill mounted at the drill mount of the osteotomy trajectory verification apparatus and inserted into a slot, according to some aspects.

FIG. 3C is an example diagram illustrating a perspective view of the osteotomy trajectory verification apparatus 200 of FIG. 2D, with the drill 280 mounted at the drill mount 232 of the osteotomy trajectory verification apparatus 200 and inserted into a slot, according to some aspects. As shown in FIG. 3C and as discussed above in reference to FIG. 2D, by sliding the sliding portion 222, the sliding arm 220 at a first position 266 may slide to a second position 262 and may slide to a third position 264, while the tip 226 of the pointing portion 224 slides along the second axis 254. The slot 290 has an opening 292 to receive a drill such as the drill 280 and guide the drill 280 along a drill trajectory/osteotomy trajectory defined by the opening 292. The osteotomy trajectory verification apparatus 200 may be moved to insert the drill 323 mounted at the drill mount 232 into the slot 290 via the opening 292 of the slot 290. As discussed in reference to FIG. 2D, when the tip 226 of the pointing portion 224 is moved along the second axis 254, the tip 226 may move along the drill trajectory of the drill 280, thereby indicating where the drill 280 may travel as the drill 280 is inserted into the patient.

Figure 4A:
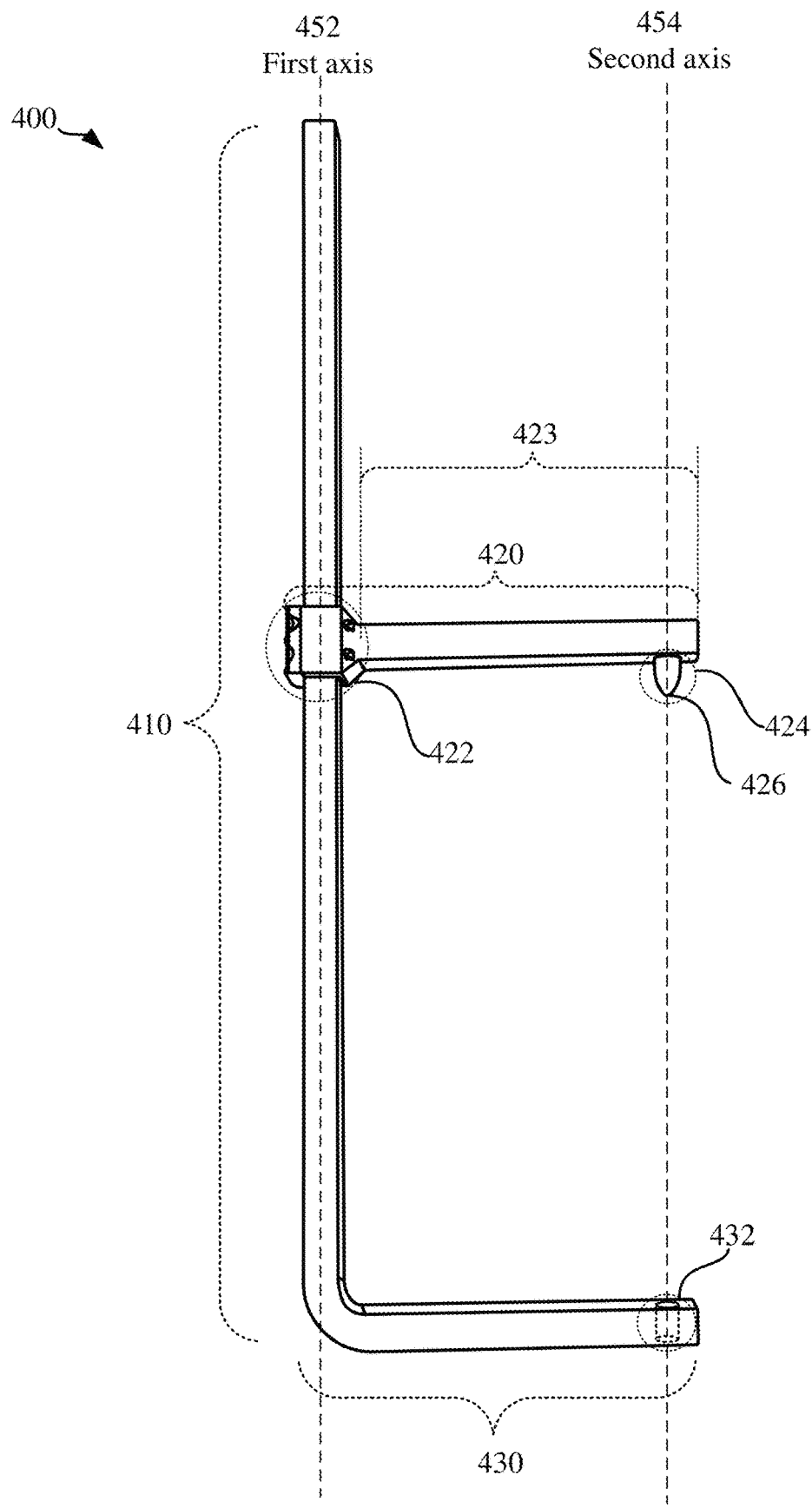
FIG. 4A is an example diagram illustrating a structure of another embodiment of an osteotomy trajectory verification apparatus, with a hole to mount a drill, according to some aspects.

FIG. 4A is an example diagram illustrating a structure of another embodiment of an osteotomy trajectory verification apparatus, with a hole to mount a drill, according to some aspects. In the embodiment shown in FIG. 4A, the osteotomy trajectory verification apparatus 400 may include a straight rod portion 410, a sliding arm 420, and a fixed arm 430. The straight rod portion 410 may extend along a first axis 442 in a first direction. The fixed arm 430 may be fixedly (e.g., integrally) coupled to the straight rod portion 410.

The sliding arm 420 may be slidably coupled to the straight rod portion 410, and may be configured to slide along a sliding direction on the straight rod portion 410 along the first axis 452, without moving in a direction different from the sliding direction.

The sliding arm 420 may include a sliding portion 422, a pointing portion 424, and an extending portion 423 having a first side attached to the sliding portion 422 and a second side attached to the pointing portion 424. For example, the first side of the extending portion 423 may be at an opposite end from the second side of the extending portion 423. In the example view shown FIG. 4A, the left side of the extending portion 423 is attached to the sliding portion 422 and the right side of the extending portion 423 is attached to the pointing portion 424. The sliding portion 422 of the sliding arm 420 may be slidably coupled to the straight rod portion 410 to slide along the sliding direction.

The pointing portion 424 of the sliding arm 420 may include a tip 426 protruded along a second axis 454 in a second direction, where the second axis 454 is parallel to or substantially parallel to the first axis 452. The second direction may align with the second axis 454, and thus may be parallel to the first direction that may align with the first axis 452. For example, when an operator of the osteotomy trajectory verification apparatus slides the sliding arm 420 up and down, the pointing portion 424 moves up and down along the second axis 454. For example, as shown in FIG. 4A, the tip 426 is protruded along the second axis 454 toward the fixed arm.

The fixed arm 430 may be configured to mount a drill thereon to point the drill along the second axis 454 toward the tip 426 of the pointing portion 424. For example, as shown in FIG. 4A, the fixed arm 430 may include a drill mount 432 that is used to mount a drill, such that the drill mounted at the drill mount 432 is pointing toward the tip 426, and lines up along the second axis 454. The drill mount 432 in FIG. 4A is a recess (or an opening) extending along the second axis 454 to allow a drill to be inserted into the recess of the drill mount 432 to fixedly mount the drill with the drill mount 432. In an example, the recess of the drill mount 432 may extend in a direction aligned with the second axis 454, to allow a drill to be aligned with the second axis 454 and to point toward the tip 426 of the pointing portion 424 when the drill is inserted into the recess of the drill mount 432.

In an example, the structures associated with the reference numbers 410, 420, 422, 424, 426, 430, 452, 454, and 480 of FIG. 4A may respectively correspond to the structures associated with the reference numbers 210, 220, 222, 224, 226, 230, 252, 254, and 280, whose descriptions are provided above in reference to FIGS. 2A-2D. Hence, for example, the difference between the osteotomy trajectory verification apparatus 400 of FIG. 4A and the osteotomy trajectory verification apparatus 200 of FIGS. 2A-2D may be related to the drill mount 432 of FIG. 4A and the drill mount 232 of FIGS. 2A-2D.

Figure 4B:
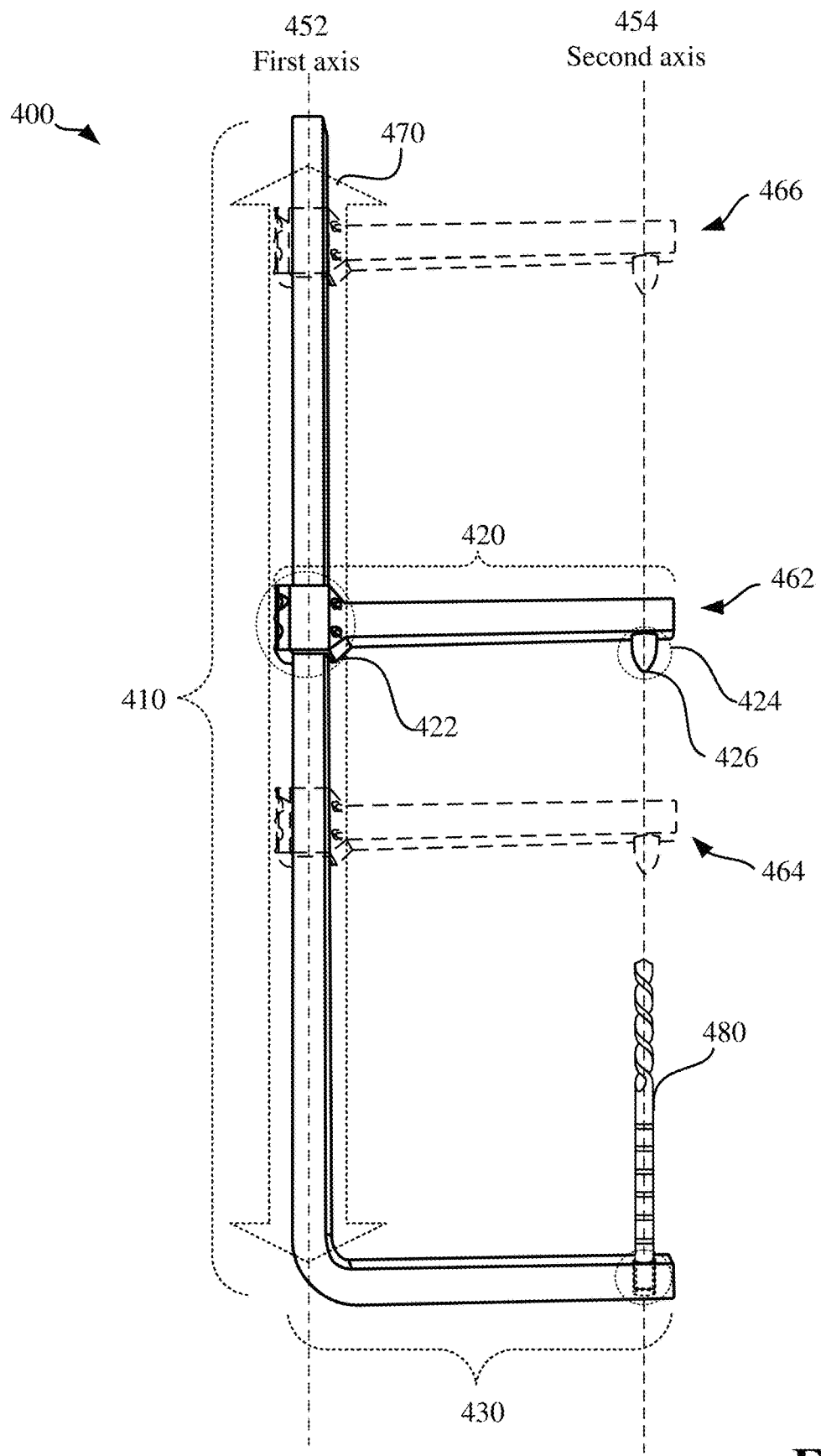
FIG. 4B is an example diagram illustrating the sliding arm being slidably coupled to the straight rod portion of the osteotomy trajectory verification apparatus, with the drill mounted at the drill mount of the osteotomy trajectory verification apparatus, according to some aspects.

FIG. 4B is an example diagram illustrating the sliding arm 420 being slidably coupled to the straight rod portion 410 of the osteotomy trajectory verification apparatus 400, with the drill 480 mounted at the drill mount 432 of the osteotomy trajectory verification apparatus 400, according to some aspects. As shown in FIG. 4B, the sliding portion 422 of the sliding arm 420 may slide along the first axis 452 while being slidably coupled to the straight rod portion 410, in the sliding direction 470, without moving in a direction different from the sliding direction 470. For example, by sliding the sliding portion 422, the sliding arm 420 at a first position 466 may slide to a second position 462 and may slide to a third position 464. FIG. 4B also shows a drill 480 that can be mounted at the drill mount 432. As shown in FIG. 4B, as the sliding portion 422 of the sliding arm 420 slides along the first axis 452, the tip 426 of the pointing portion 424 slides along the second axis 454.

As shown in FIGS. 4B, regardless of the position of the sliding arm 420, the pointing portion 424 and the tip 426 of the pointing portion 424 are aligned with the second axis 454 parallel to the first axis 452. Further, as shown in FIG. 4B, regardless of the position of the sliding arm 420, the pointing portion 424 and the tip 426 of the pointing portion 424 point toward the drill mount 432.

As such, the second axis 454 that may align with a drill trajectory may be indicated by the tip 426 of the pointing portion 424. For example, a location of the tip 426 of the pointing portion 424 may indicate a portion of the drill trajectory of the drill 480. For example, the tip 426 of the pointing portion 424 may slide with the sliding movement of the sliding arm 420 to indicate the drill trajectory of the drill 480, where the drill trajectory may align with the second axis 454. By observing the sliding movement of the tip 426 of the pointing portion 424, the drill trajectory of the drill 480 may be visualized.

Figure 4C:
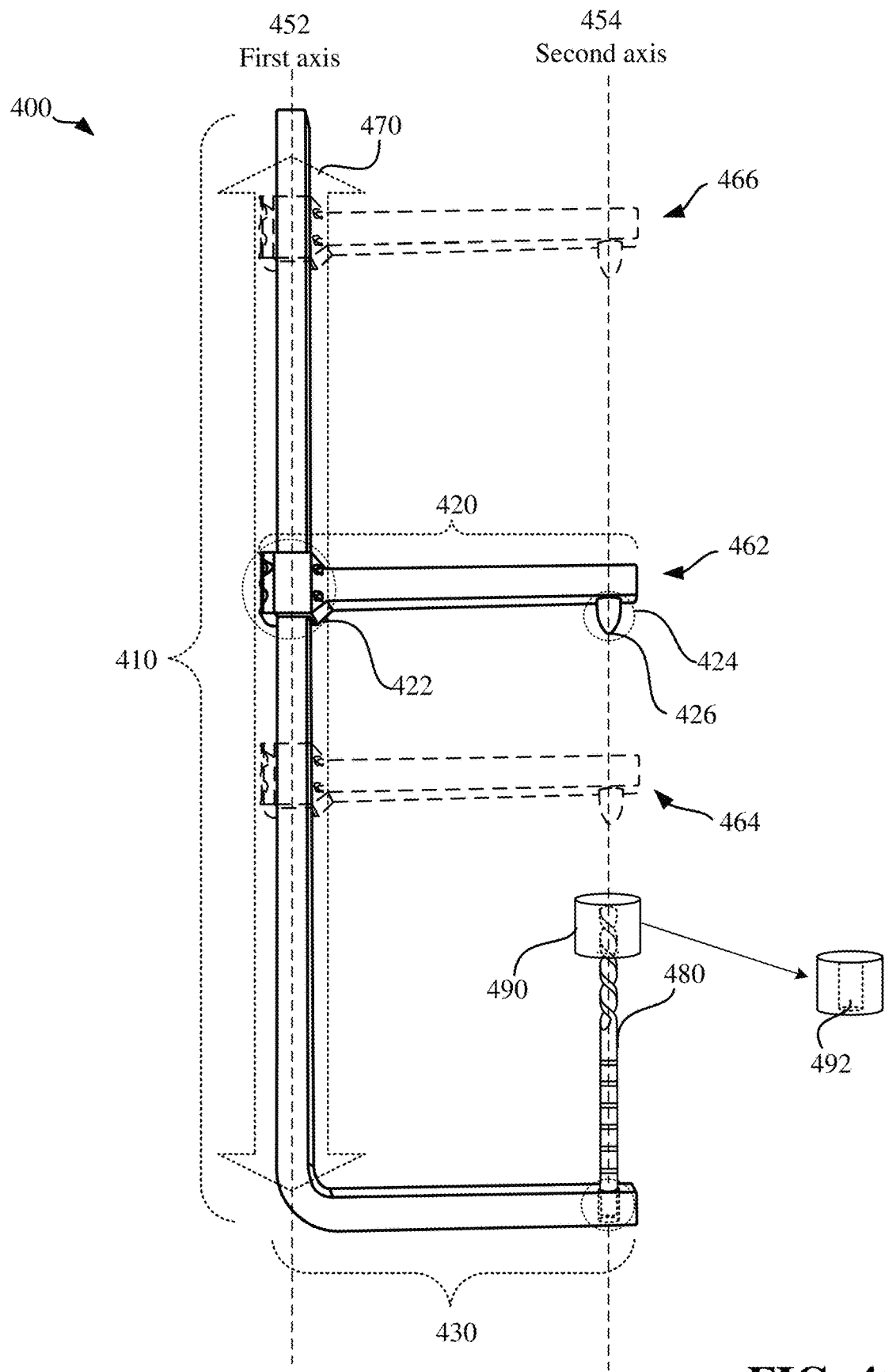

FIG. 4C is an example diagram illustrating the sliding arm 420 being slidably coupled to the straight rod portion 410 of the osteotomy trajectory verification apparatus 400, with the drill 480 mounted at the drill mount 432 of the osteotomy trajectory verification apparatus 400 and inserted into a slot, according to some aspects. In FIG. 4C, by sliding the sliding portion 422, the sliding arm 420 at a first position 466 may slide to a second position 462 and may slide to a third position 464, while the tip 426 of the pointing portion 424 slides along the second axis 454. As discussed above, a slot such as a slot 490 may be planted on a portion of patient's oral cavity. The slot 490 has an opening 492 to receive a drill such as the drill 480 and guide the drill 480 along a drill trajectory/osteotomy trajectory defined by the opening 492. The osteotomy trajectory verification apparatus 400 may be moved to insert the drill 323 mounted at the drill mount 432 into the slot 490 via the opening 492 of the slot 490. For simplicity, the patient's oral cavity has not been illustrated in FIG. 4C.

When the drill 480 is inserted into the slot 490, the drill 480 fits tightly or snugly into the opening 492 of the slot 490 such that the drill may move only along the drill trajectory defined by the opening 492. Further, when the drill 480 is inserted into the slot 490, the drill trajectory defined by the opening 492 may overlap with the second axis 454. Hence, when the tip 426 of the pointing portion 424 is moved along the second axis 454, the tip 426 may move along the drill trajectory of the drill 480, thereby indicating where the drill 480 may travel as the drill 480 is inserted into the patient. The sliding arm 420 may stay outside the oral cavity of the patient when the drill 480 mounted at the drill mount 432 is inserted into the slot 490, and the tip 426 of the pointing portion 424 of the sliding arm 420 may be used to indicate the drill trajectory of the drill 480 and a location at which the drill 480 may exit out of the patient's skull. As such, while the drill 480 mounted at the drill mount 432 is inserted into the slot 490, the tip 426 of the pointing portion 424 may be used to visualize the drill trajectory and to verify that the drill trajectory does not align with undesirable areas of the patients. For example, if a position of the tip 426 indicates that the drill trajectory may be in or near a vital area such as an eye or an orbit or an infratemporal fossa of the patient, then this may indicate that the slot 490 is not correctly planted at the patient's oral cavity, and thus the slot 490 may be re-planted at the patient's oral cavity to avoid the drill trajectory being close to the vital area of the patient.

Figure 5A:
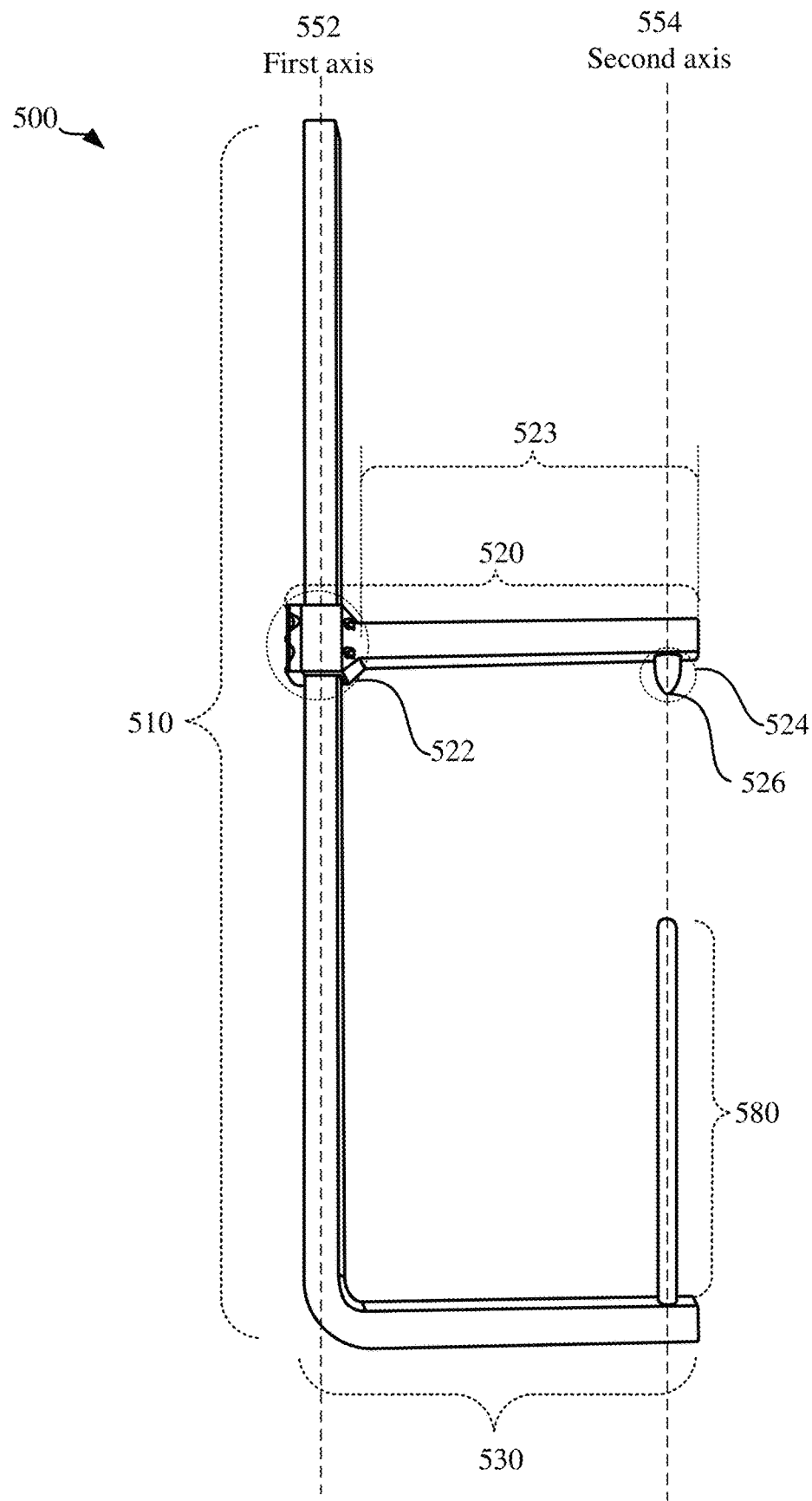
FIG. 5A is an example diagram illustrating a structure of another embodiment of an osteotomy trajectory verification apparatus, without a drill mount, according to some aspects.

FIG. 5A is an example diagram illustrating a structure of another embodiment of an osteotomy trajectory verification apparatus, without a drill mount, according to some aspects. In the embodiment shown in FIG. 5A, the osteotomy trajectory verification apparatus 500 may include a straight rod portion 510, a sliding arm 520, and a fixed arm 530. The straight rod portion 510 may extend along a first axis 542 in a first direction. The fixed arm 530 may be fixedly (e.g., integrally) coupled to the straight rod portion 510.

The sliding arm 520 may be slidably coupled to the straight rod portion 510, and may be configured to slide along a sliding direction on the straight rod portion 510 along the first axis 552, without moving in a direction different from the sliding direction.

The sliding arm 520 may include a sliding portion 522, a pointing portion 524, and an extending portion 523 having a first side attached to the sliding portion 522 and a second side attached to the pointing portion 524. For example, the first side of the extending portion 523 may be at an opposite end from the second side of the extending portion 523. In the example view shown FIG. 5A, the left side of the extending portion 523 is attached to the sliding portion 522 and the right side of the extending portion 523 is attached to the pointing portion 524. The sliding portion 522 of the sliding arm 520 may be slidably coupled to the straight rod portion 510 to slide along the sliding direction.

The pointing portion 524 of the sliding arm 520 may include a tip 526 protruded along a second axis 554 in a second direction, where the second axis 554 is parallel to or substantially parallel to the first axis 552. The second direction may align with the second axis 554, and thus may be parallel to the first direction that may align with the first axis 552. For example, when an operator of the osteotomy trajectory verification apparatus slides the sliding arm 520 up and down, the pointing portion 524 moves up and down along the second axis 554. For example, as shown in FIG. 5A, the tip 526 is protruded along the second axis 554 toward the fixed arm.

In FIG. 5A, a drill protrusion 580 that has a circumference of a drill may be mounted at the fixed arm 530 to align with the second axis 554, such that the drill protrusion 580 may extend along the second axis 554 toward the tip 526 of the pointing portion 524. For example, as shown in FIG. 5A, the drill protrusion 580 may be attached to the fixed arm 530, such that the drill protrusion 580 on the fixed arm 530 is pointing toward the tip 526, and lines up along the second axis 554. Because the drill protrusion 580 has a thickness or a circumference of a drill to be used for osteotomy, a separate drill does not need to be mounted at the fixed arm 530.

In an example, the structures associated with the reference numbers 510, 520, 522, 524, 526, 530, 552, and 554 of FIG. 5A may respectively correspond to the structures associated with the reference numbers 210, 220, 222, 224, 226, 230, 252, and 254, whose descriptions are provided above in reference to FIGS. 2A-2D. Hence, for example, the difference between the osteotomy trajectory verification apparatus 500 of FIG. 5A and the osteotomy trajectory verification apparatus 200 of FIGS. 2A-2D may be related to the drill protrusion 580 of FIG. 5A and the drill mount 232 of FIGS. 2A-2D.

Figure 5B:
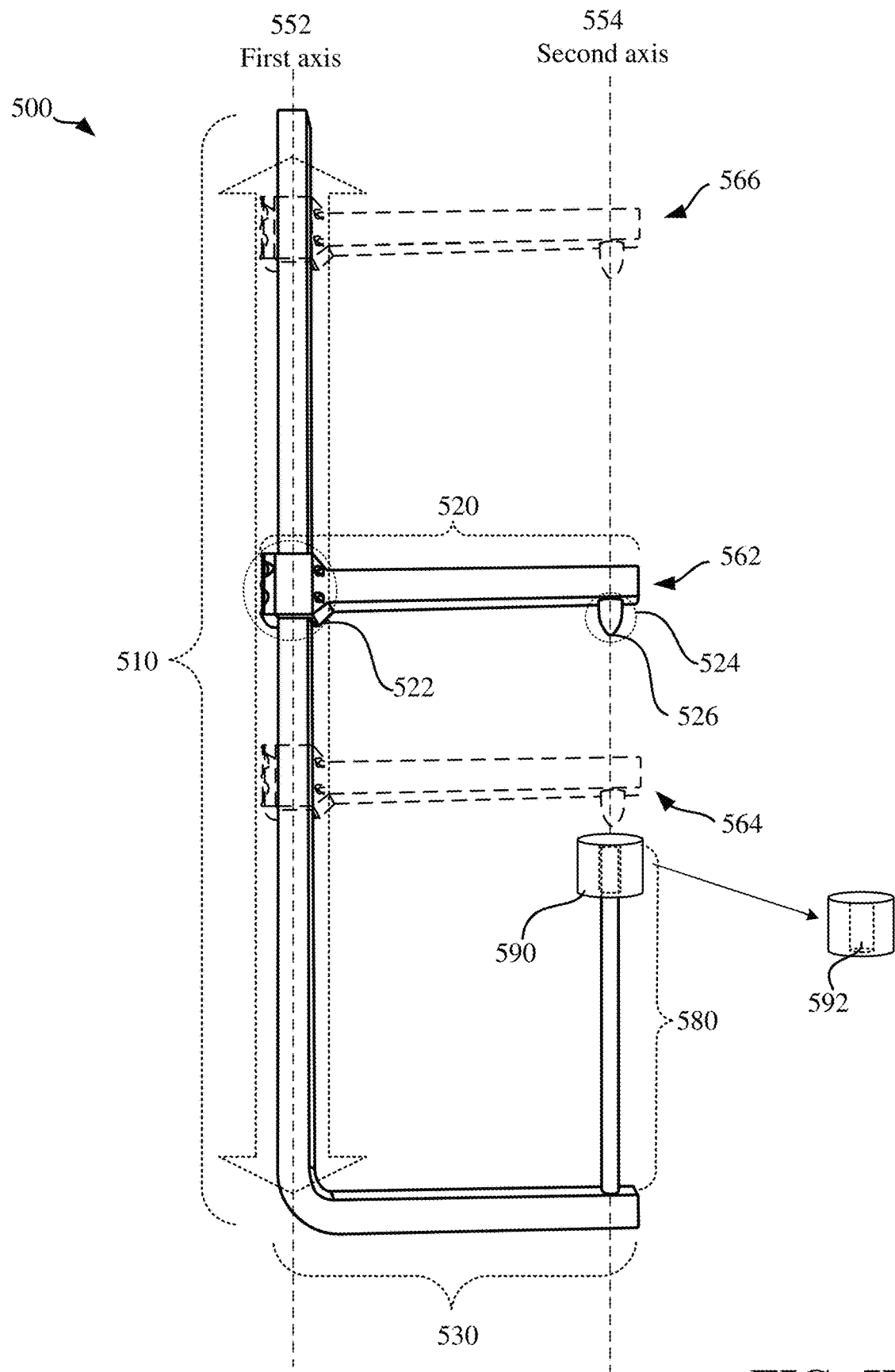
FIG. 5B is an example diagram illustrating the sliding arm being slidably coupled to the straight rod portion of the osteotomy trajectory verification apparatus, with the drill protrusion of the osteotomy trajectory verification apparatus inserted into a slot, according to some aspects.

FIG. 5B is an example diagram illustrating the sliding arm 520 being slidably coupled to the straight rod portion 510 of the osteotomy trajectory verification apparatus 500, with the drill protrusion 580 of the osteotomy trajectory verification apparatus 500 inserted into a slot, according to some aspects. In FIG. 5B, by sliding the sliding portion 522, the sliding arm 520 at a first position 566 may slide to a second position 562 and may slide to a third position 564, while the tip 526 of the pointing portion 524 slides along the second axis 554. A slot such as a slot 590 may be planted on a portion of patient's oral cavity. The slot 590 has an opening 592 to receive the drill protrusion 580 guide the drill protrusion 580 along a drill trajectory/osteotomy trajectory defined by the opening 592. The osteotomy trajectory verification apparatus 500 may be moved to insert the drill protrusion 580 into the slot 590 via the opening 592 of the slot 590. For simplicity, the patient's oral cavity has not been illustrated in FIG. 5B.

When the drill protrusion 580 is inserted into the slot 590, the drill protrusion 580 fits tightly or snugly into the opening 592 of the slot 590 such that the drill protrusion 580 may move only along the drill trajectory defined by the opening 592. Further, when the drill protrusion 580 is inserted into the slot 590, the drill trajectory defined by the opening 592 may overlap with the second axis 554. Hence, when the tip 526 of the pointing portion 524 is moved along the second axis 554, the tip 526 may move along the drill trajectory defined by the drill protrusion 580, thereby indicating where a drill corresponding to the drill protrusion 580 may travel as the drill is inserted into the patient. The drill corresponding to the drill protrusion 580 may have the same thickness or the same circumference as the drill protrusion 580, and thus may also fit tightly or snugly into the opening 592 of the slot 590 such that the drill may move only along the drill trajectory defined by the opening 592.

The sliding arm 520 may stay outside the oral cavity of the patient when the drill protrusion 580 is inserted into the slot 590, and the tip 526 of the pointing portion 524 of the sliding arm 520 may be used to indicate the drill trajectory defined by the drill protrusion 580 and a location at which the drill corresponding to the drill protrusion 580 may exit out of the patient's skull. As such, while the drill protrusion 580 is inserted into the slot 590, the tip 526 of the pointing portion 524 may be used to visualize the drill trajectory and to verify that the drill trajectory does not align with undesirable areas of the patients. For example, if a position of the tip 526 indicates that the drill trajectory may be in or near a vital area such as an eye or an orbit or an infratemporal fossa of the patient, then this may indicate that the slot 590 is not correctly planted at the patient's oral cavity, and thus the slot 590 may be re-planted at the patient's oral cavity to avoid the drill trajectory being close to the vital area of the patient.

Figure 6A:
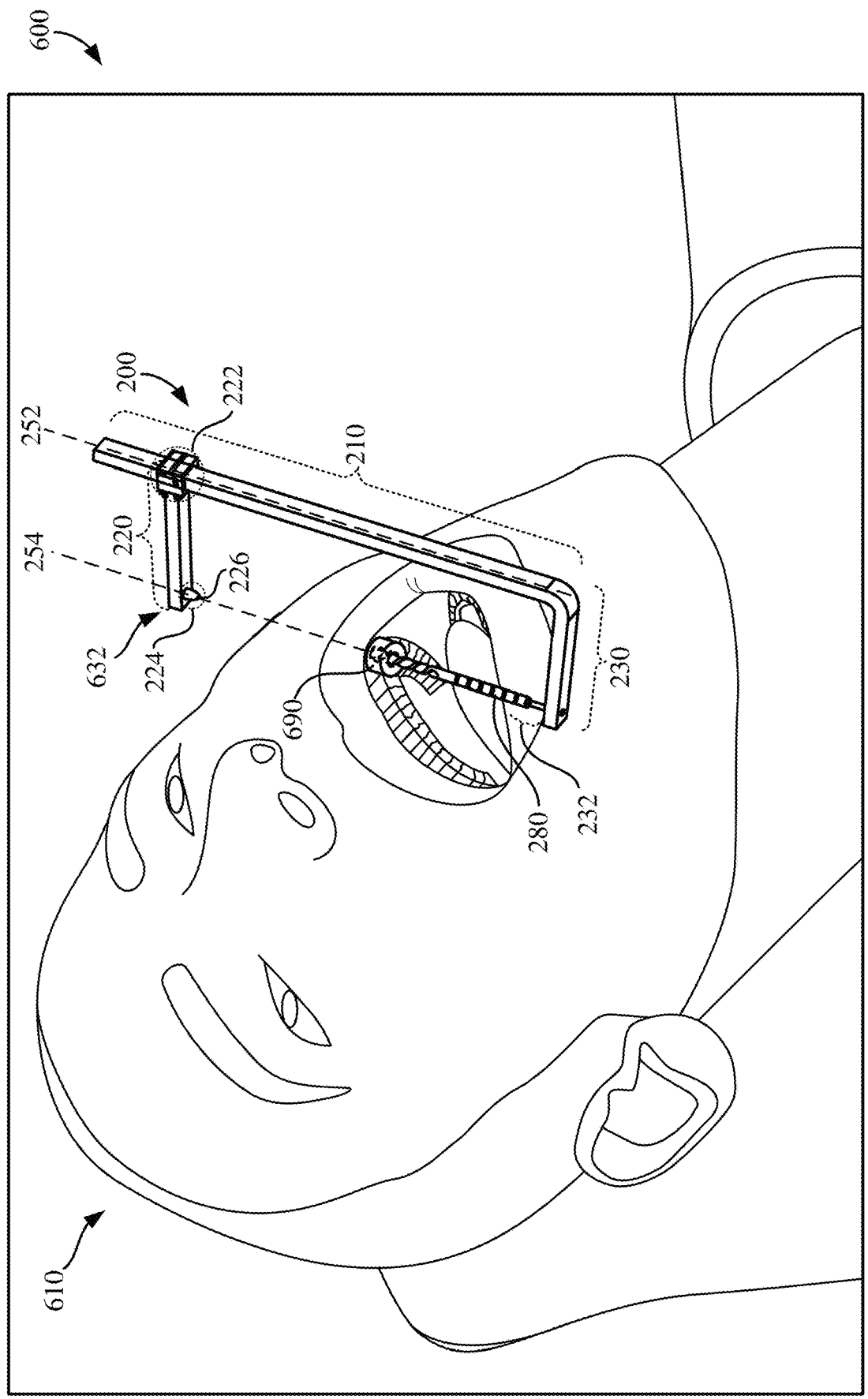
FIG. 6A is an example diagram illustrating a drill mounted on the osteotomy trajectory verification apparatus being inserted into a slot, according to some aspects.
Figure 6B:
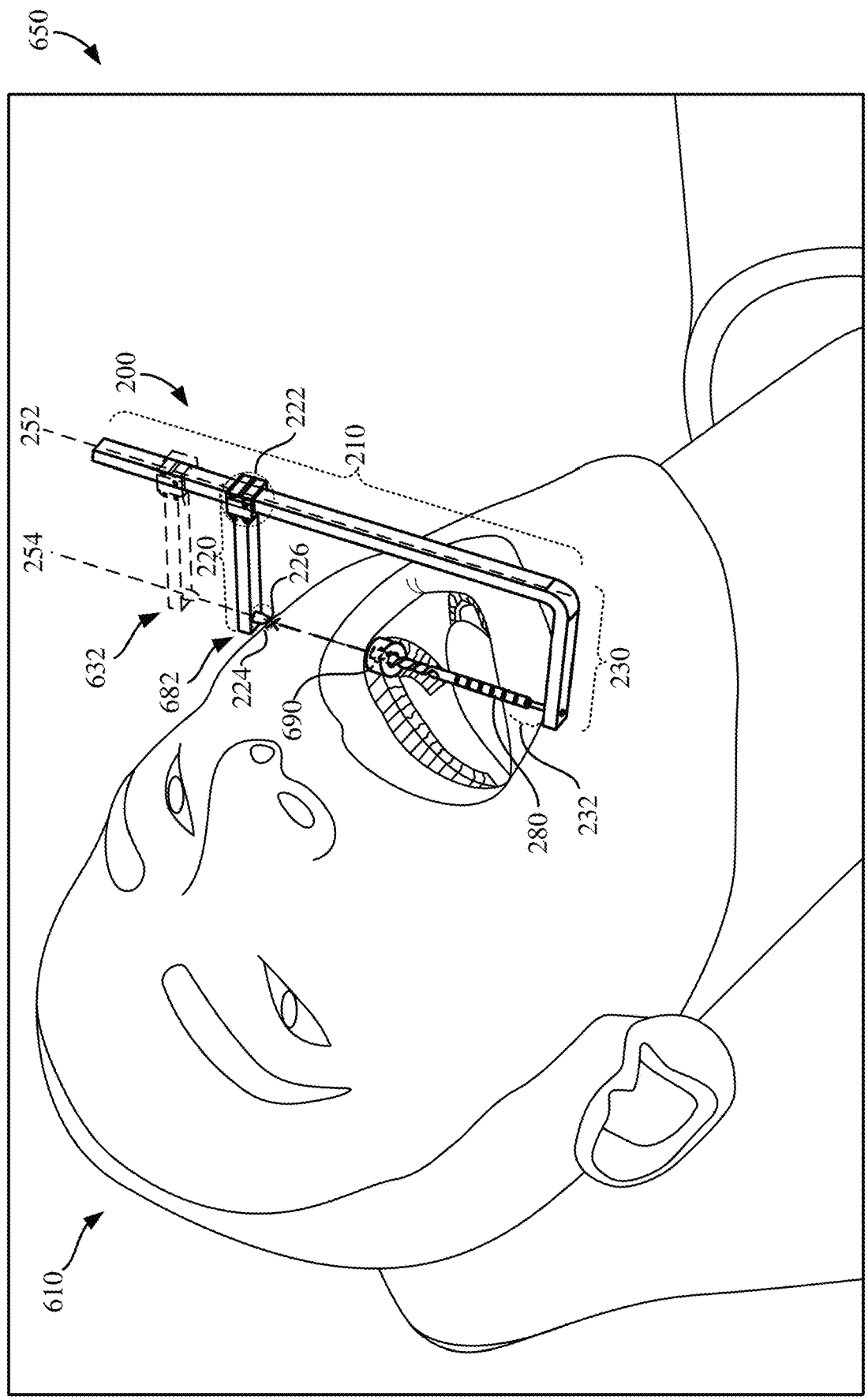
FIG. 6B is an example diagram illustrating a sliding movement of a sliding arm to move a pointing portion of the sliding arm along a second axis to verify a drill trajectory/ osteotomy trajectory guided by a slot, according to some aspects.

FIGS. 6A and 6B are example diagrams illustrating verification of an osteotomy trajectory in a dental implant procedure using an osteotomy trajectory verification apparatus, according to some aspects. FIGS. 6A and 6B show that the osteotomy trajectory verification apparatus 200 of FIGS. 2A-2D is used. However, it is understood that a different embodiment of the osteotomy trajectory verification apparatus such as the osteotomy trajectory verification apparatus 300 of FIGS. 3A-3C and the osteotomy trajectory verification apparatus 400 of FIGS. 4A-4B may also be used to verify an osteotomy trajectory in a dental implant procedure.

FIG. 6A is an example diagram 600 illustrating a drill mounted on the osteotomy trajectory verification apparatus 200 being inserted into a slot, according to some aspects. As discussed above, the osteotomy trajectory verification apparatus 200 shown in FIG. 6A as well as in FIGS. 2A-2D includes the straight rod portion 210, the sliding arm 220, and the fixed arm 230, where the straight rod portion 210 may extend along a first axis 252 in a first direction and the fixed arm 230 may be fixedly (e.g., integrally) coupled to the straight rod portion 210. When the sliding arm 220 is moved, the pointing portion 224 of the sliding arm 220 may move along the second axis 254 together with the sliding portion 222 of the sliding arm 220 when the sliding portion 222 slides on the straight rod portion 210 along the first axis 252. The additional details of the structures of the osteotomy trajectory verification apparatus 200 are described above in reference to FIGS. 2A-2D, and thus omitted for brevity. In FIG. 6A, the drill 280 is mounted at the drill mount 232 of the osteotomy trajectory verification apparatus 200, such that the drill 280 mounted at the drill mount 232 is pointing toward the tip 226 of the pointing portion 224, and lines up along the second axis 254. A slot 690 is fixedly planted on a portion of the oral cavity of a patient 610. This portion of the oral cavity may be a site for an artificial tooth during a zygomatic implant surgery.

In FIG. 6A, after the slot 690 is planted on the portion of the oral cavity, the drill 280 mounted on the osteotomy trajectory verification apparatus 200 may be inserted into an opening of the slot 690 while the sliding arm 220 is positioned outside of the oral cavity of the patient 610. When the drill 280 is inserted into the slot 690, the sliding arm 220 may be at a first position 632. The sliding arm 220 may be moved by sliding via the sliding portion 222 along the sliding direction outside of the oral cavity of the patient 610 to move the tip 226 of the pointing portion 224 along the second axis 254. By sliding the sliding arm 220, an operator of the osteotomy trajectory verification apparatus 200 may visualize the drill trajectory of the drill 280 inserted into the slot 690, based on the travel path of the tip 226 of the pointing portion 224 along the second axis 254 as the tip 226 moves along the second axis 254.

FIG. 6B is an example diagram 650 illustrating a sliding movement of the sliding arm 220 to move the pointing portion 224 of the sliding arm 220 along the second axis 254 to verify a drill trajectory/osteotomy trajectory guided by a slot, according to some aspects. After inserting the drill 280 into the slot 690, the sliding arm 220 may be moved toward the patient 610 until the pointing portion 224 comes in contact with a portion of the patient 610. In FIG. 6B, the sliding arm 220 is moved toward the patient 610 from the first position 632 to a second position 682 where the pointing portion 224 contacts a portion of a face of the patient 610. The portion of the patient 610 (e.g., on the patient's face) where the pointing portion 224 contacts may be marked (e.g., with a pen) for a further verification.

In the example diagrams of FIGS. 6A and 6B, it can be verified that the drill trajectory of the drill 280 inserted into the slot 690 is not at or near a vital structure of the patient 610 that needs to be avoided, based on the movement of the tip 226 of the pointing portion 224 along the second axis 254. Further verifications may be made by moving the pointing portion 224 toward the patient 610 and marking the portion of the patient 610 that comes in contact with the pointing portion 224, where the marking on the portion indicates that the drill trajectory is not at or near the vital structure of the patient 610 that needs to be avoided.

Figure 7A:
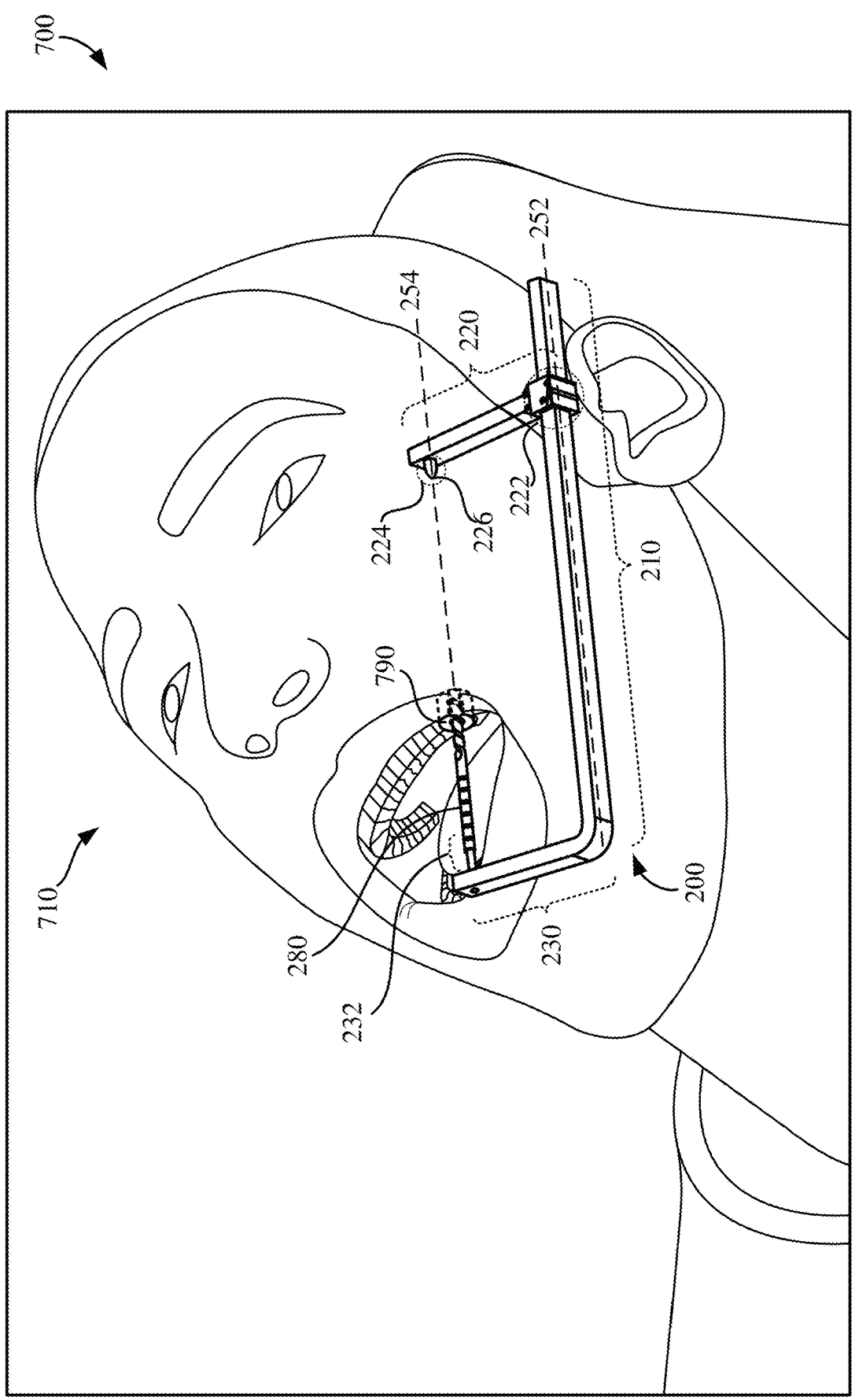
FIG. 7A is an example diagram where an osteotomy trajectory verification by the osteotomy trajectory verification apparatus indicates that a drill trajectory guided by a slot avoids vital structures of a patient, according to some aspects.
Figure 7B:
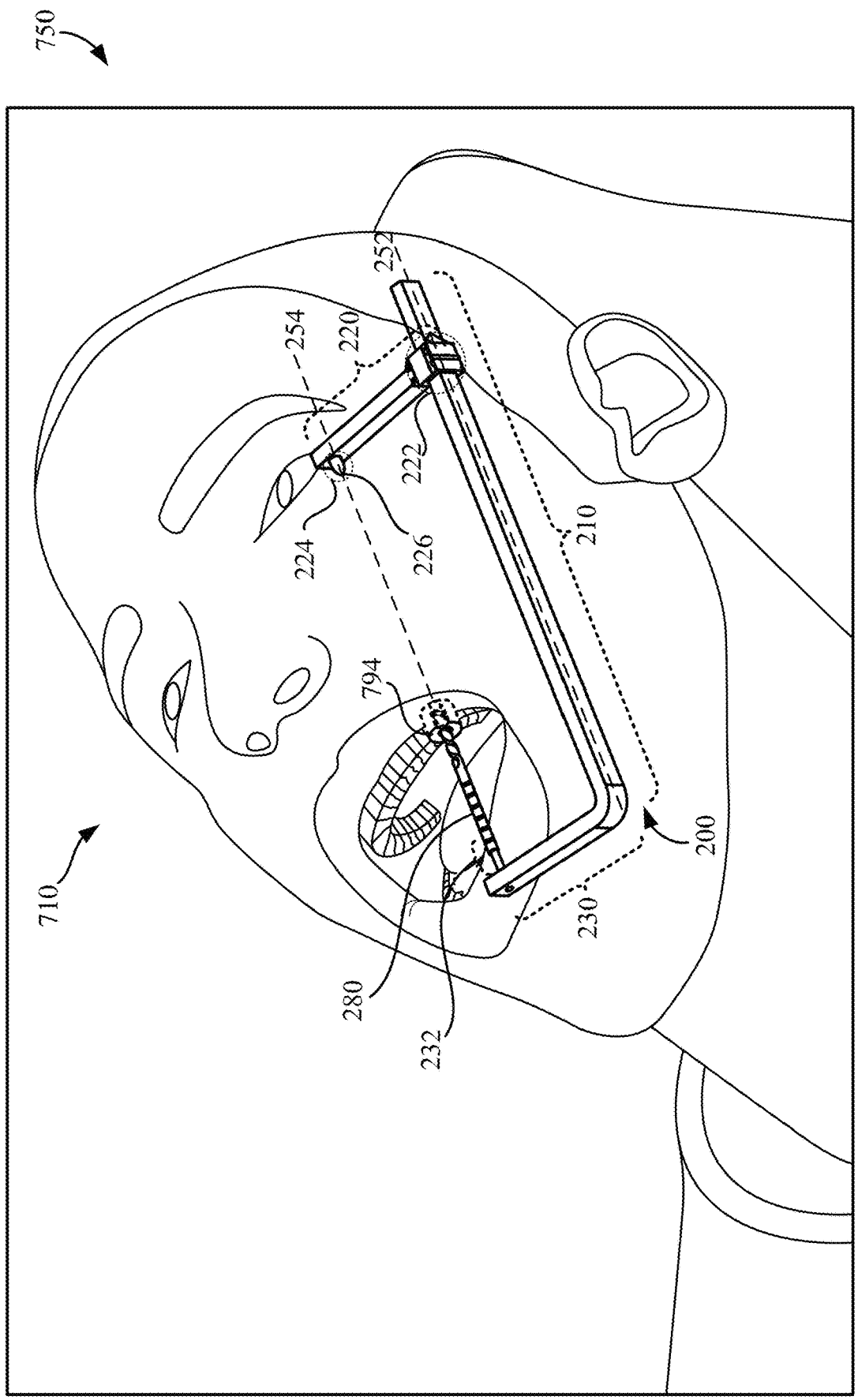
FIG. 7B is an example diagram where an osteotomy trajectory verification by the osteotomy trajectory verification apparatus indicates that a drill trajectory guided by a slot aligns with an orbit of the patient, according to some aspects.

FIG. 7A is an example diagram 700 where an osteotomy trajectory verification by the osteotomy trajectory verification apparatus 200 indicates that an osteotomy trajectory guided by a slot avoids vital structures of a patient, according to some aspects. FIG. 7B is an example diagram 750 where a drill trajectory verification by the osteotomy trajectory verification apparatus 200 indicates that a drill trajectory guided by a slot aligns with an orbit of the patient, according to some aspects. FIGS. 7A and 7B show that the osteotomy trajectory verification apparatus 200 of FIGS. 2A-2D is used, but a different embodiment of the osteotomy trajectory verification apparatus such as the osteotomy trajectory verification apparatus 300 of FIGS. 3A-3C and the osteotomy trajectory verification apparatus 400 of FIGS. 4A-4B may also be used.

For example, the osteotomy trajectory verification apparatus 200 shown in FIGS. 7A-7B as well as in FIGS. 2A-2D includes the straight rod portion 210, the sliding arm 220, and the fixed arm 230, where the straight rod portion 210 may extend along a first axis 252 in a first direction and the fixed arm 230 may be fixedly (e.g., integrally) coupled to the straight rod portion 210. When the sliding arm 220 is moved, the pointing portion 224 of the sliding arm 220 may move along the second axis 254 together with the sliding portion 222 of the sliding arm 220 when the sliding portion 222 slides on the straight rod portion 210 along the first axis 252. The additional details of the structures of the osteotomy trajectory verification apparatus 200 are described above in reference to FIGS. 2A-2D, and thus omitted for brevity. In FIGS. 7A and 7B, the drill 280 is mounted at the drill mount 232 of the osteotomy trajectory verification apparatus 200, such that the drill 280 mounted at the drill mount 232 is pointing toward the tip 226 of the pointing portion 224, and lines up along the second axis 254.

In FIG. 7A, a slot 790 is fixedly planted on a portion of the oral cavity of a patient 710. After the slot 790 is planted on the portion of the oral cavity, the drill 280 mounted on the osteotomy trajectory verification apparatus 200 may be inserted into an opening of the slot 790 while the sliding arm 220 is positioned outside of the oral cavity of the patient 710. The sliding arm 220 may be moved by sliding via the sliding portion 222 along the sliding direction outside of the oral cavity of the patient 710 to move the tip 226 of the pointing portion 224 along the second axis 254. By sliding the sliding arm 220, an operator of the osteotomy trajectory verification apparatus 200 may visualize the drill trajectory of the drill 280 inserted into the slot 790, based on the travel path of the tip 226 of the pointing portion 224 along the second axis 254 as the tip 226 moves along the second axis 254. In FIG. 7A, by sliding the sliding arm 220, the operator of the osteotomy trajectory verification apparatus 200 may determine that the drill trajectory of the drill 280 avoids vital structures such as orbits and infratemporal fossa of the patient 710 based on the movement of the tip 226 along the second axis 254. Hence, in FIG. 7A, the operator may determine that the slot 790 is properly planted at the oral cavity of the patient 710, and thus may proceed with an osteotomy procedure by drilling into the oral cavity via the slot 790.

In FIG. 7B, a slot 794 is fixedly planted on a portion of the oral cavity of a patient 710. After the slot 794 is planted on the portion of the oral cavity, the drill 280 mounted on the osteotomy trajectory verification apparatus 200 may be inserted into an opening of the slot 794 while the sliding arm 220 is positioned outside of the oral cavity of the patient 710. The sliding arm 220 may be moved by sliding via the sliding portion 222 along the sliding direction outside of the oral cavity of the patient 710 to move the tip 226 of the pointing portion 224 along the second axis 254. By sliding the sliding arm 220, an operator of the osteotomy trajectory verification apparatus 200 may visualize the drill trajectory of the drill 280 inserted into the slot 794, based on the travel path of the tip 226 of the pointing portion 224 along the second axis 254 as the tip 226 moves along the second axis 254. In FIG. 7B, by sliding the sliding arm 220, the operator of the osteotomy trajectory verification apparatus 200 may determine that the drill trajectory of the drill 280 is near an orbit of the patient 710 based on the movement of the tip 226 along the second axis 254. Hence, in FIG. 7B, the operator may determine that the slot 794 is not properly planted at the oral cavity of the patient 710 and may not perform osteotomy based on the slot 794 planted on the patient 710. Instead, the operatory may attempt to correctly plant a slot at the oral cavity of the patient 710 again, to avoid the vital structures of the patient 710 during an osteotomy procedure. Hence, as shown in FIGS. 7A and 7B and as discussed above, the osteotomy trajectory verification apparatus 200 may allow avoiding an error in the osteotomy procedure based on the verification of the drill trajectory.

Figure 8:
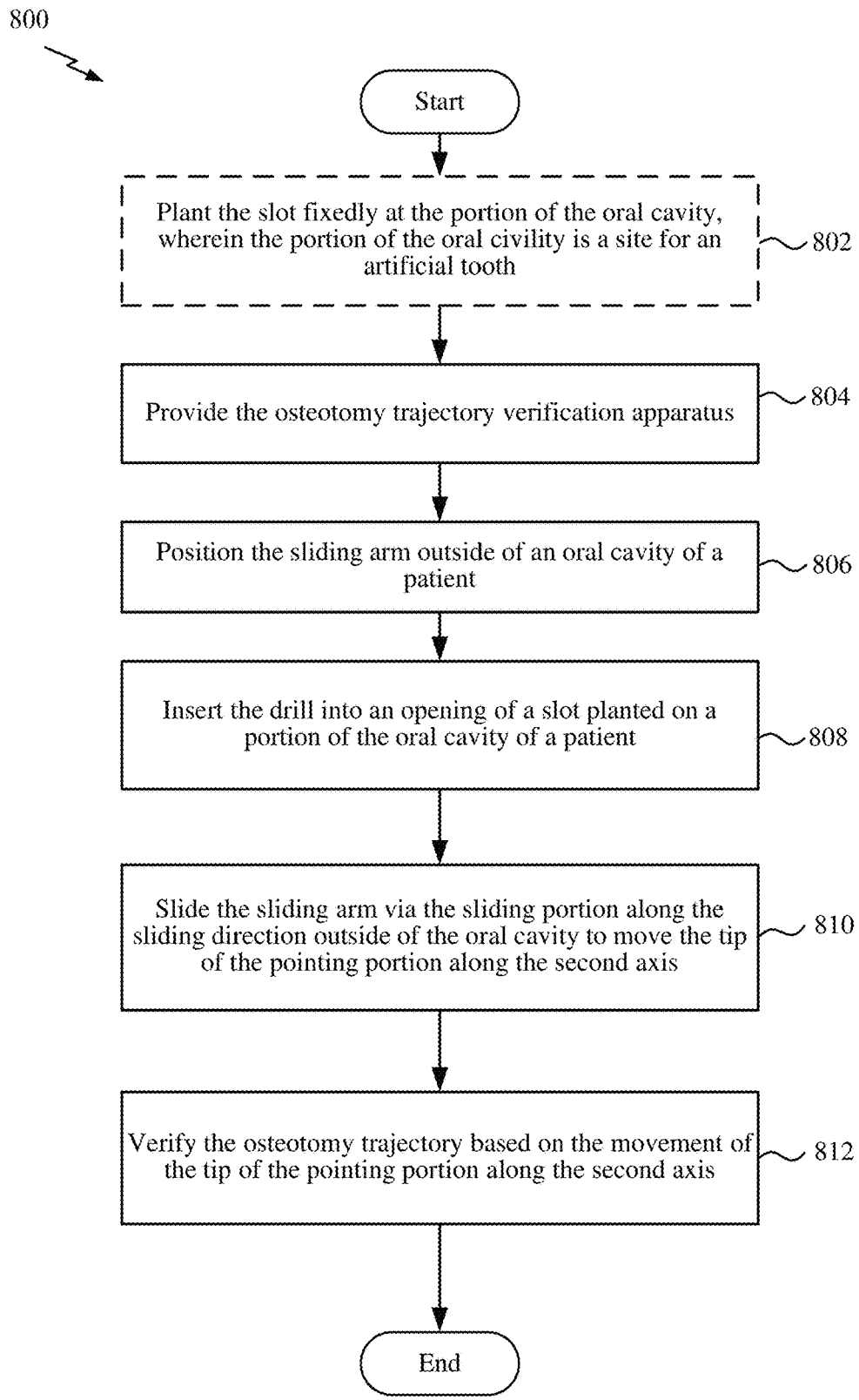
FIG. 8 is a flow chart illustrating an exemplary process for verifying an osteotomy trajectory in a dental implant procedure using an osteotomy trajectory verification apparatus, according to some aspects.

FIG. 8 is a flow chart illustrating an exemplary process 800 for verifying an osteotomy trajectory in a dental implant procedure using an osteotomy trajectory verification apparatus in accordance with some aspects. As described below, some or all illustrated features may be omitted in a particular implementation within the scope of the present disclosure, and some illustrated features may not be required for implementation of all embodiments. In some examples, the process 800 may be carried out by using the osteotomy trajectory verification apparatus. In some examples, the process 800 may be carried out using the osteotomy trajectory verification apparatus 200 of FIG. 2 or the osteotomy trajectory verification apparatus 400 of FIG. 4 or the osteotomy trajectory verification apparatus 500 of FIG. 5.

In an aspect, at block 802, the process 800 may include planting the slot fixedly at the portion of the oral cavity, where the portion of the oral cavity is a site for an artificial tooth.

At block 804, the process 800 includes providing the osteotomy trajectory verification apparatus.

The osteotomy trajectory verification apparatus includes a straight rod portion extending along a first axis in a first direction, a sliding arm slidably coupled to the straight rod portion and configured to slide along a sliding direction on the straight rod portion along the first axis without moving in a direction different from the sliding direction, and a fixed arm coupled to the straight rod portion. The sliding arm may include a sliding portion slidably coupled to the straight rod portion to slide along the sliding direction, a pointing portion including a tip protruded along a second axis in a second direction, the second axis being at least substantially parallel to the first axis, and an extending portion having a first side attached to the sliding portion and a second side attached to the pointing portion. In an aspect, the fixed arm may be configured to mount a drill thereon to point the drill along the second axis toward the tip of the pointing portion and the drill is mounted at the fixed arm or a drill protrusion is attached to the fixed arm to point the drill protrusion toward the tip of the pointing portion while extending along the second axis.

In an aspect, the drill or the drill protrusion may be fixedly received by the slot while pointing directly toward the tip of the pointing portion along the second axis.

At block 806, the process 800 further includes positioning the sliding arm outside of an oral cavity of a patient.

At block 808, the process 800 further includes inserting the drill into an opening of a slot planted on a portion of the oral cavity of a patient. In an aspect, the opening of the slot may guide the drill or the drill protrusion in a direct of the osteotomy trajectory.

At block 810, the process 800 further includes sliding the sliding arm via the sliding portion along the sliding direction outside of the oral cavity to move the tip of the pointing portion along the second axis.

At block 812, the process 800 further includes verifying the osteotomy trajectory based on the movement of the tip of the pointing portion along the second axis.

In an aspect, the verification of the osteotomy trajectory at block 812 may include sliding the sliding arm toward the patient until the pointing portion comes in contact with a portion of the patient, placing a mark on the portion of the patient where the pointing portion is in contact, and verifying the osteotomy trajectory based on the mark.

In an aspect, the verification of the osteotomy trajectory at block 812 may include determining the osteotomy trajectory based on the movement of the tip of the pointing portion along the second axis, and verifying that the osteotomy trajectory avoids a vital part of the patient.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The invention claimed is:

1. An apparatus for verifying an osteotomy trajectory in a dental implant procedure, comprising:
   a straight rod portion extending along a first axis in a first direction;
   a sliding arm slidably coupled to the straight rod portion and configured to slide along a sliding direction on the straight rod portion along the first axis without moving in a direction different from the sliding direction, the sliding arm comprising:
      a sliding portion slidably coupled to the straight rod portion to slide along the sliding direction;
      a pointing portion consisting of a single tip protruded along a second axis in a second direction, the second axis being parallel to the first axis; and
      an extending portion having a first side attached to the sliding portion and a second side attached to the pointing portion; and
   a fixed arm coupled to the straight rod portion and configured to mount a drill thereon to align the drill to extend along the second axis with a tip of the drill facing toward the single tip of the pointing portion on the second axis.

2. The apparatus of claim 1, wherein the sliding arm includes an opening through which the straight rod portion is slidably inserted to slidably couple to the sliding arm.

3. The apparatus of claim 2, wherein the opening of the sliding arm is non-circular, and
   wherein a shape of the opening of the sliding arm is substantially the same as a shape of a cross-section of the straight rod portion to prevent a rotation about the straight rod portion.

4. The apparatus of claim 3, wherein the shape of the opening of the sliding arm is one of a polygon shape, an elliptical shape, and a star shape.

5. The apparatus of claim 1, the straight rod portion includes a rail extending along the straight rod portion, and the sliding arm is slidably coupled on the rail to slide along the straight rod portion along the first axis.

6. The apparatus of claim 1, wherein the fixed arm includes a recess to fixedly mount the drill therein.

7. The apparatus of claim 1, wherein the single tip of the pointing portion is configured to move along the second axis along with a movement of the sliding portion along the sliding direction.

8. The apparatus of claim 1, wherein when the drill is mounted on the fixed arm, the drill is fixedly receivable by a slot prepared on a dental surgical site while pointing directly toward the single tip of the pointing portion along the second axis to verify the osteotomy trajectory.

9. The apparatus of claim 8, wherein the dental surgical site is for a zygomatic dental implant,
   a drill protrusion attached to the fixed arm to extend along the second axis with a tip of the drill protrusion facing toward the tip of the pointing portion on the second axis.

10. An apparatus for verifying an osteotomy trajectory in a dental implant procedure, comprising:
    a straight rod portion extending along a first axis in a first direction; and
    a sliding arm slidably coupled to the straight rod portion and configured to slide along a sliding direction on the straight rod portion along the first axis without moving in a direction different from the sliding direction, the sliding arm comprising:
       a sliding portion slidably coupled to the straight rod portion to slide along the sliding direction,
       a pointing portion consisting of a single tip protruded along a second axis in a second direction, the second axis being parallel to the first axis, and
       an extending portion having a first side attached to the sliding portion and a second side attached to the pointing portion;
    a fixed arm coupled to the straight rod portion; and
    a drill protrusion attached to the fixed arm to extend along the second axis with a tip of the drill protrusion facing toward the simile tip of the pointing portion on the second axis.

11. The apparatus of claim 10, wherein the sliding arm includes an opening through which the straight rod portion is slidably inserted to slidably couple to the sliding arm.

12. The apparatus of claim 11, wherein the opening of the sliding arm is non-circular, and
    wherein a shape of the opening of the sliding arm is substantially the same as a shape of a cross-section of the straight rod portion to prevent a rotation about the straight rod portion.

13. The apparatus of claim 10, the straight rod portion includes a rail extending along the straight rod portion, and the sliding arm is slidably coupled on the rail to slide along the straight rod portion along the first axis.

14. The apparatus of claim 10, wherein the single tip of the pointing portion is configured to move along the second axis along with a movement of the sliding portion along the sliding direction.

15. The apparatus of claim 10, wherein when the drill protrusion is fixedly receivable by a slot prepared on a dental surgical site while pointing directly toward the single tip of the pointing portion along the second axis to verify the osteotomy trajectory.

16. A method of verifying an osteotomy trajectory in a dental implant procedure using an osteotomy trajectory verification apparatus, comprising:
providing the osteotomy trajectory verification apparatus, the osteotomy trajectory verification apparatus including:
a straight rod portion extending along a first axis in a first direction;
a sliding arm slidably coupled to the straight rod portion and configured to slide along a sliding direction on the straight rod portion along the first axis without moving in a direction different from the sliding direction, the sliding arm comprising:
a sliding portion slidably coupled to the straight rod portion to slide along the sliding direction,
a pointing portion consisting of a single tip protruded along a second axis in a second direction, the second axis being parallel to the first axis, and
an extending portion having a first side attached to the sliding portion and a second side attached to the pointing portion; and
a fixed arm coupled to the straight rod portion, wherein the fixed arm is configured to mount a drill thereon to align the drill to extend along the second axis with a tip of the drill facing toward the single tip of the pointing portion on the second axis and the drill is mounted at the fixed arm, or a drill protrusion is attached to the fixed arm to extend along the second axis with a tip of the drill protrusion facing toward the single tip of the pointing portion on the second axis;
inserting the drill or the drill protrusion into an opening of a slot planted on a portion of the oral cavity of the patient, wherein the opening of the slot guides the drill or the drill protrusion in a direction of the osteotomy trajectory;
sliding the sliding arm via the sliding portion along the sliding direction outside of the oral cavity to move the single tip of the pointing portion along the second axis; and
verifying the osteotomy trajectory based on the movement of the single tip of the pointing portion along the second axis.

17. The method of claim 16, further comprising:
planting the slot fixedly at the portion of the oral cavity by attaching the slot to the portion of the oral cavity, the slot having the opening to guide the drill or the drill protrusion in the direction of the osteotomy trajectory, wherein the portion of the oral cavity is a site for an artificial tooth.

18. The method of claim 16, wherein the verifying the osteotomy trajectory comprises:
sliding the sliding arm toward the patient until the pointing portion comes in contact with a portion of the patient;
placing a mark on the portion of the patient where the pointing portion is in contact; and
verifying the osteotomy trajectory based on the mark.

19. The method of claim 16, wherein the verifying the osteotomy trajectory comprises:
determining the osteotomy trajectory based on the movement of the single tip of the pointing portion along the second axis; and
verifying that the osteotomy trajectory avoids a vital part of the patient.

20. The apparatus of claim 16, wherein the drill or the drill protrusion is fixedly received by the slot while pointing directly toward the single tip of the pointing portion along the second axis.

* * * * *